United States Patent
Santos et al.

(10) Patent No.: US 12,050,014 B2
(45) Date of Patent: Jul. 30, 2024

(54) SYSTEMS AND METHODS FOR REAL-TIME ADAPTIVE AIR QUALITY AND POLLUTION CONTROL IN FOOD PROCESSING AND OTHER THERMAL PROCESSING ENVIRONMENTS

(71) Applicant: Samsung Electronics Company, Ltd., Gyeonggi-do (KR)

(72) Inventors: Jose Marcel C. Santos, Sunnyvale, CA (US); Tiberiu A. Andronescu, Ontario (CA); Thomas Brenner, Sunnyvale, CA (US); Jun Yeon Cho, San Jose, CA (US); Paul Hsiao, Sunnyvale, CA (US); Musa Maharramov, The Woodlands, TX (US); Brian R. Patton, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/585,340

(22) Filed: Jan. 26, 2022

(65) Prior Publication Data
US 2023/0235893 A1 Jul. 27, 2023

(51) Int. Cl.
*F24C 15/20* (2006.01)
*G05B 15/02* (2006.01)

(52) U.S. Cl.
CPC ...... *F24C 15/2021* (2013.01); *F24C 15/2085* (2013.01); *F24C 15/2092* (2013.01); *G05B 15/02* (2013.01); *F24C 15/20* (2013.01)

(58) Field of Classification Search
USPC ........................................................ 700/276
See application file for complete search history.

(56) References Cited

U.S. PATENT DOCUMENTS 9,578,694 B2 2/2017 Meusburger et al.
9,835,339 B2 12/2017 Min
(Continued)

FOREIGN PATENT DOCUMENTS

CN 114543142 A 5/2022
KR 10-2017-0137335 A 12/2017
KR 10-2021-0067604 A 6/2021

OTHER PUBLICATIONS

Broan, "Range Hoods, Design for Life"; Broan.com, https://www.broan-nutone.com/getmedia/c0db16b1-96ea-491c-bf10-d6dfce6d1540/Broan-under-cabinet-range-hoods-appliance-channel.pdf; 20 pages. Printed in USA, 99851018B, 2019.
(Continued)

*Primary Examiner* — Emilio J Saavedra

(57) ABSTRACT

In one embodiment, a method for controlling air quality in an unenclosed kitchen environment by a ventilation system includes determining an environmental state of the kitchen environment based on sensor data from sensors associated with the ventilation system, determining a current air quality of the kitchen environment based on the sensor data, determining adjustments for system-boundaries or air-manipulating devices associated with the ventilation system based on the current air quality and the environmental state, wherein the adjustments are configured to facilitate a target air quality of the kitchen environment; and adjusting the system-boundaries or air-manipulating devices associated with the ventilation system based on the determined adjustments.

20 Claims, 23 Drawing Sheets

(56) References Cited

U.S. PATENT DOCUMENTS

| | | |
|---|---|---|
| 10,082,299 B2 | 9/2018 | Livchak |
| 10,302,307 B2 | 5/2019 | Burdett |
| 10,690,353 B2 | 6/2020 | Park et al. |
| 11,067,291 B2 | 7/2021 | Kweon |
| 11,353,218 B2 | 6/2022 | Yoon |
| 2005/0224069 A1 | 10/2005 | Patil |
| 2006/0154590 A1 | 7/2006 | Kanaya |
| 2007/0062513 A1 | 3/2007 | Gagas |
| 2014/0230662 A1* | 8/2014 | Siegel ................ F24C 15/2021 99/344 |
| 2021/0123602 A1 | 4/2021 | Heo |
| 2021/0123605 A1* | 4/2021 | Heo .................... F24C 15/2085 |
| 2021/0131937 A1* | 5/2021 | Van Der Sluis ....... G01N 15/06 |
| 2021/0247074 A1* | 8/2021 | Sinur ................ F24C 15/2021 |
| 2022/0042694 A1* | 2/2022 | He .......................... F24F 11/88 |
| 2022/0113034 A1* | 4/2022 | Moore ................ F24F 11/0001 |
| 2022/0221161 A1 | 7/2022 | Cha |

OTHER PUBLICATIONS

PCT Search Report and written opinion in PCT/KR2023/000371, Apr. 7, 2023.

* cited by examiner

SYSTEMS AND METHODS FOR REAL-TIME ADAPTIVE AIR QUALITY AND POLLUTION CONTROL IN FOOD PROCESSING AND OTHER THERMAL PROCESSING ENVIRONMENTS

TECHNICAL FIELD

This disclosure relates generally to air quality and pollution control within thermal processing environments, and in particular relates to ventilation in such environments.

BACKGROUND

Home ventilation devices such as kitchen exhaust hoods and bathroom exhaust fans are critical to both safety and user experience. Kitchen hoods can both reduce the undesired spread of cooking odors, as well as dangerous pollutants, such as carbon monoxide and formaldehyde, which can be generated by natural gas and propane stoves. Contemporary ventilation systems used at industrial and residential food processing facilities come in a wide variety of designs. Diversity of the existing designs applies to the geometry of active and passive surfaces, volumes and direction of forced airflows, dimension and scalability, as well as the types of filtration and recirculation systems. This multitude of options, each of which represents a successful solution to a niche problem, reflects a wide range of conditions associated with sources, volumes, and type of thermal, particulate and gaseous pollutants and odorants in typical food and other thermal processing applications.

HVAC (Heating, Ventilation, and Air Conditioning) design and pollution modeling in industrial and residential food processing facilities are an active research field. Particularly, ventilation is among critical commercial and household systems and has a guaranteed share of the consumer appliance and commercial equipment markets. Even incremental improvements in safety and efficiency of ventilation may translate to a significant overall impact both in terms customer satisfaction and profit margins.

DESCRIPTION OF EXAMPLE EMBODIMENTS

Figure 1A:
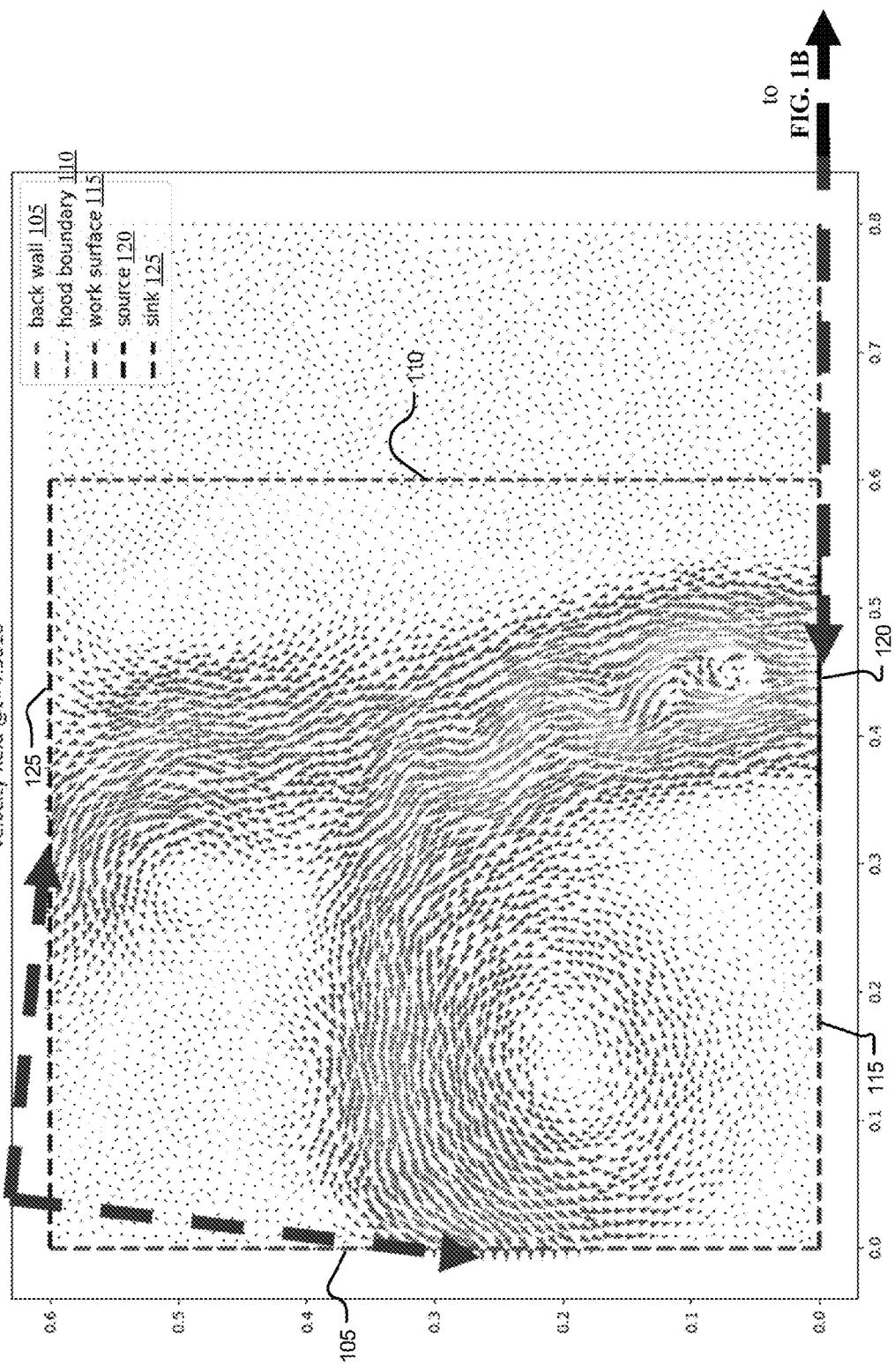
FIGS. 1A-1B illustrate example computational fluid dynamics (CFD) simulations.

Real-Time Adaptive Air Quality and Pollution Control in Food Processing and Other Thermal Processing Environments In particular embodiments, a ventilation system may be used in an arbitrary unenclosed thermal processing environment for achieving desirable environmental conditions by automatically adjusting all or a part of its settings in response to sensory input. The ventilation system may comprise both fixed (e.g., cooktop/stovetop or cabinet walls in a kitchen setting) and variable-geometry (e.g., adjustable canopy in a kitchen setting) components, and both actively air-manipulating (e.g., fans, heaters, and heat exchangers) and passive (e.g., bounding surfaces and diffusors) components. Given continuous or discrete, precisely measured or estimated time-lapse air temperature, pollutant concentration, and water saturation readings at various spatially discrete or continuous locations, and given known or estimated source coordinates, initial temperature and rate of influx of each pollutant, the ventilation system may modify the variable part of system boundary and controllable parameters such as, without limitation, air velocity, pressure, and temperature on parts of the boundary with active components such as, without limitation, fans, heaters, and heat exchangers, to achieve the desired conditions such as, without limitation, a certain level of instantaneous or cumulative pollutant concentration, temperature, and water saturation, at spatially discrete or continuous target locations and times. In particular embodiments, the ventilation system may be applicable to various settings including both kitchen settings and non-kitchen settings (e.g. laboratory and industrial settings). For illustration purposes, this disclosure describes the ventilation system for kitchen ventilation as the main application. However, this disclosure contemplates any suitable area of application where the ventilation system may be used for air quality and pollution control in unenclosed indoor thermal processing environments. Although this disclosure describes particular air quality control by particular system in a particular environment in a particular manner, this disclosure contemplates any suitable air quality control by any suitable system in any suitable environment in any suitable manner.

In particular embodiments, the ventilations system may determine, based on sensor data from one or more sensors associated with the ventilation system, an environmental state of an unenclosed kitchen environment. The ventilation system may then determine, based on the sensor data, a current air quality of the kitchen environment. In particular embodiments, the ventilation system may determine, based on the current air quality and the environmental state, one or more adjustments for one or more system-boundaries or one or more air-manipulating devices associated with the ventilation system. The adjustments may be configured to facilitate a target air quality of the kitchen environment. The ventilation system may further adjust, based on the determined adjustments, the one or more system-boundaries or air-manipulating devices associated with the ventilation system.

Certain technical challenges exist for real-time adaptive air quality and pollution control. One technical challenge may include determining the adjustments of system boundaries. The solution presented by the embodiments disclosed herein to address this challenge may be optimizing the system boundaries and boundary conditions based on Navier-Stokes and convection (advection)-diffusion partial differential equations as these equations may characterize adjusting the system boundaries as a mathematical model that is theoretically validated, thereby resulting in reliable adjustment considering all relevant parameters associated with a thermal processing environment. Another technical challenge may include effectively determining adjustments of system boundaries and air-manipulating devices. The solution presented by the embodiments disclosed herein to address this challenge may be determining the adjustments based on the current air quality, the environment state, and the user actions as these variables may enable the ventilation system to predict contaminant propagation and calculate error with optional filtering, both of which may be used to determine the adjustments to achieve a target air quality.

Certain embodiments disclosed herein may provide one or more technical advantages. A technical advantage of the embodiments may include adaptive real-time adjustment of adjustable parameters associated with a thermal processing environment, comprising geometric, mechanical, and thermal characteristics, as the ventilation system may leverage advances in computational science, automation, and miniaturization to implement air quality and pollution control systems. Certain embodiments disclosed herein may provide none, some, or all of the above technical advantages. One or more other technical advantages may be readily apparent to one skilled in the art in view of the figures, descriptions, and claims of the present disclosure.

Contemporary ventilation systems used at industrial and residential food processing facilities may come in a wide variety of designs. While the relative strengths of different configurations for different environmental conditions have long been recognized, limited capabilities of electromechanical automation may have so far precluded the development of feasible adaptive designs that could modify system parameters, such as geometry, in response to changing external conditions.

Figure 1B:
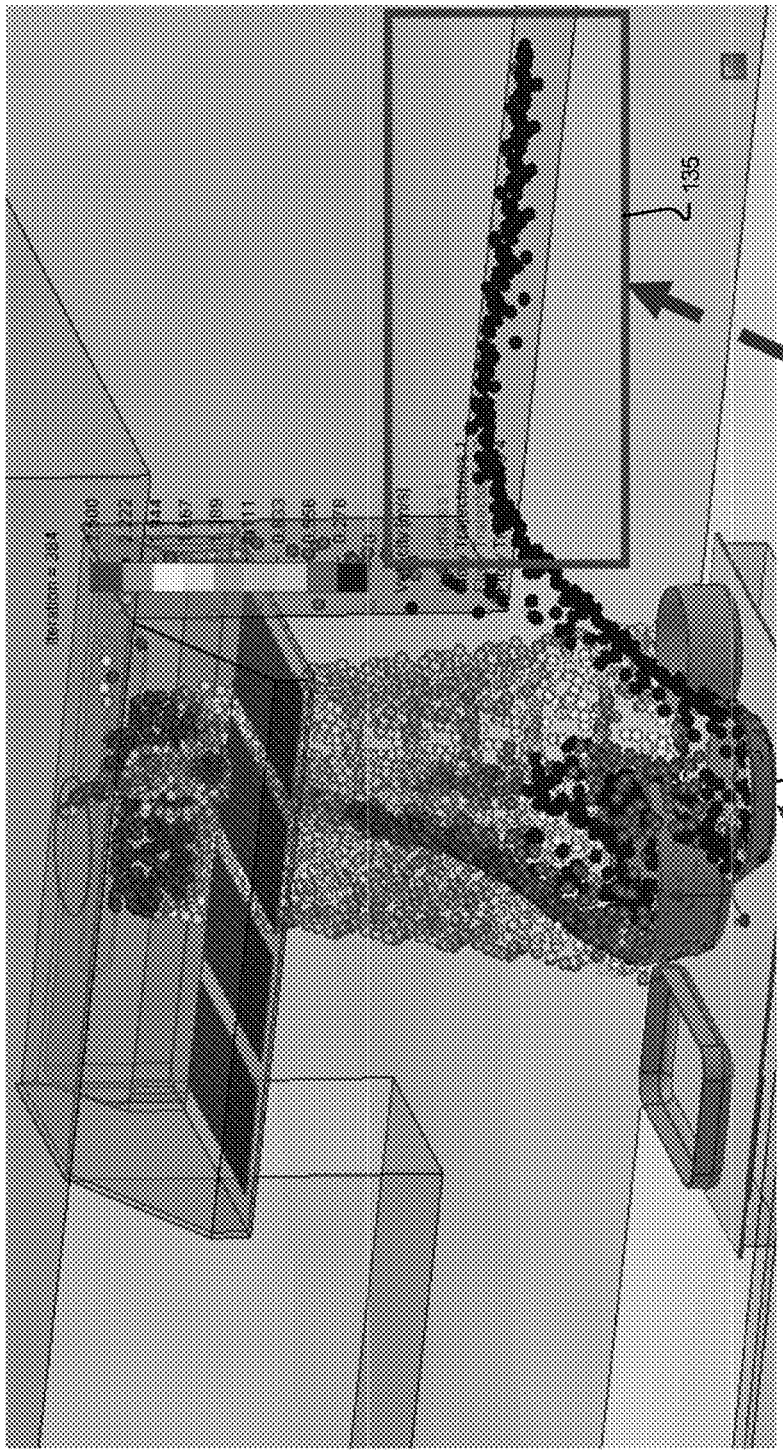

FIGS. 1A-1B illustrate example computational fluid dynamics (CFD) simulations. In particular embodiments, the unenclosed kitchen environment may comprise at least one open boundary. As an example and not by way of limitation, there may be a back wall 105, a hood boundary 110, a work surface 115, a source 120, and a sink 125. The CFD simulation in FIG. 1A may be based on velocity field @t=4.9510 second. The x-axis and y-axis may both reflect the distance. FIG. 1A illustrates that there may be multiple forced outflows 130. FIG. 1B illustrates that distance or obstructed sources may be more sensitive to environmental factors and prone to leakage 135. The CFD simulations may suggest that additional air flow devices, and especially dynamically activated multi-point inflow and outflow air streams, may improve the efficiency of traditional kitchen hoods by ameliorating leakages. This assistive effect may be sensitive to relative positioning and relative flow speeds.

Figure 2:
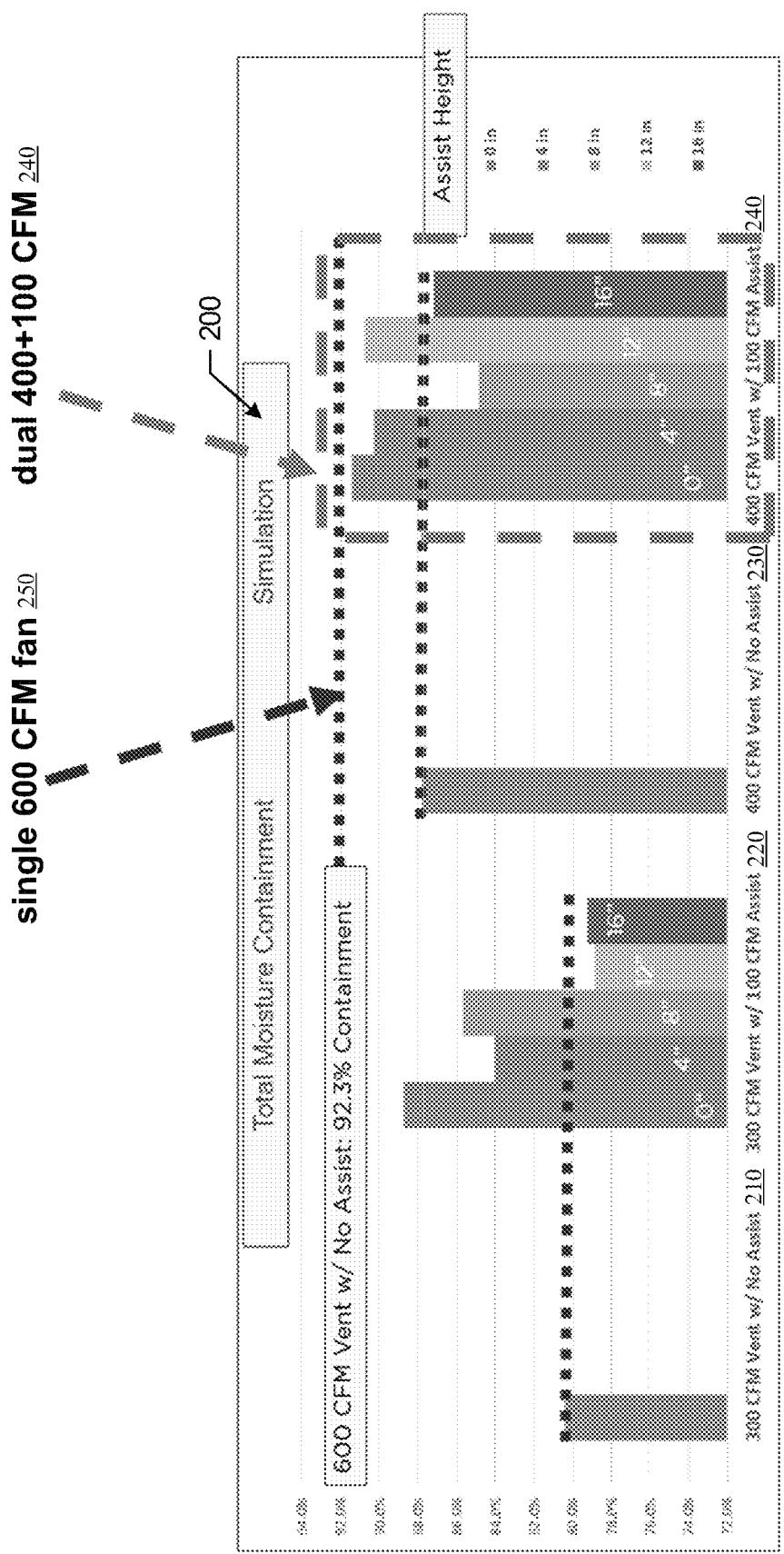
FIG. 2 illustrates an example comparison between multi-point outflows and single-point outflows.

FIG. 2 illustrates an example comparison between multi-point outflows and single-point outflows. The comparison may be based on total moisture containment simulation 200. There may be comparison between 300 CFM vent with no assist 210 and 300 CFM vent with 100 CFM assist 220, and comparison between 400 CFM vent with no assist 230 and 400 CFM vent with 100 CFM assist 240. As demonstrated in FIG. 2, optimal positioning of multi-point or distributed outflows may exceed the containment characteristics of comparable single-point outflows (e.g., single extraction aperture), as demonstrated by the simulation of a single 600 CFM fan 250 versus dual 400+100 CFM systems 240.

Figure 3A:
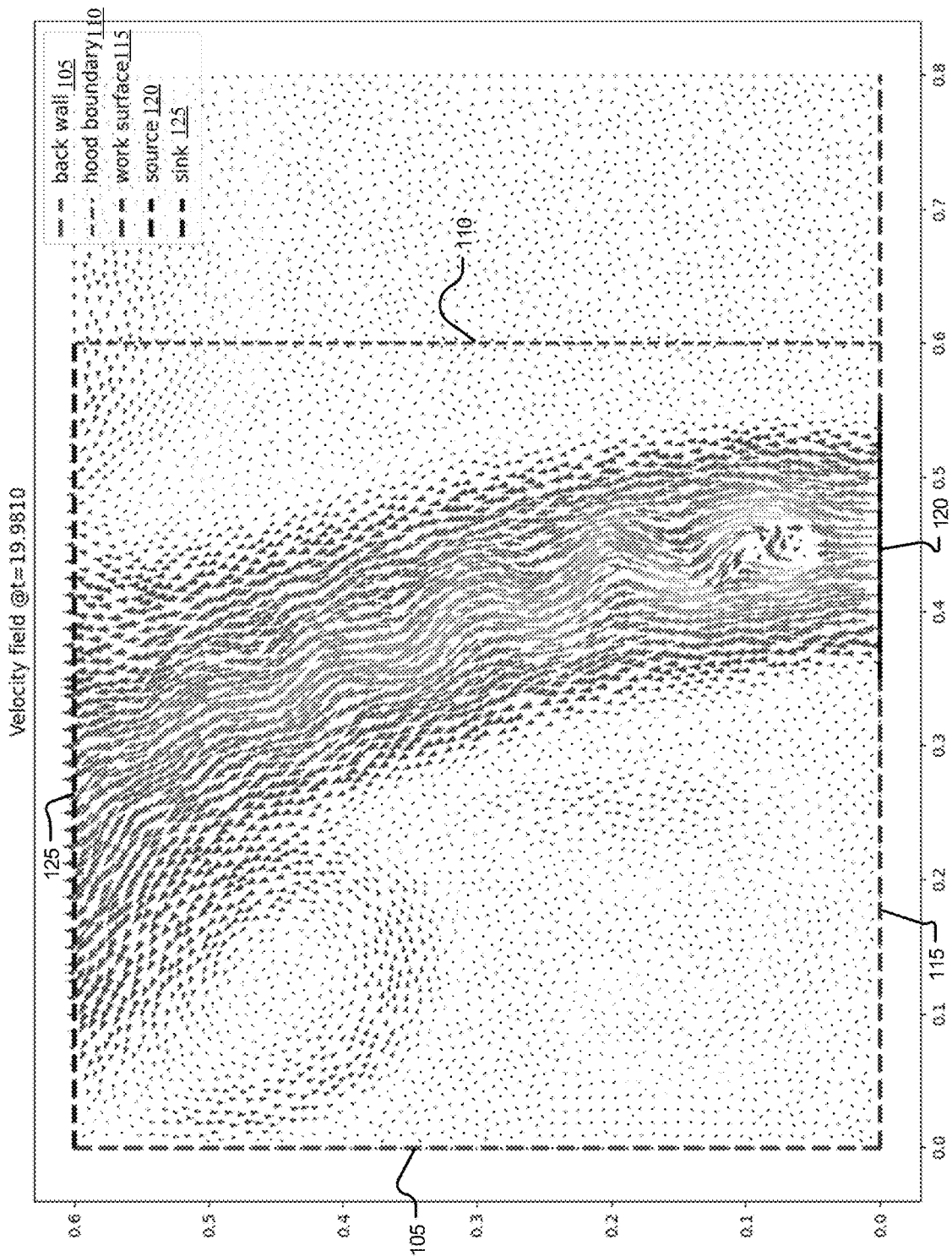
FIGS. 3A-3F illustrate example CFD simulation and convection-diffusion simulation.
Figure 3B:
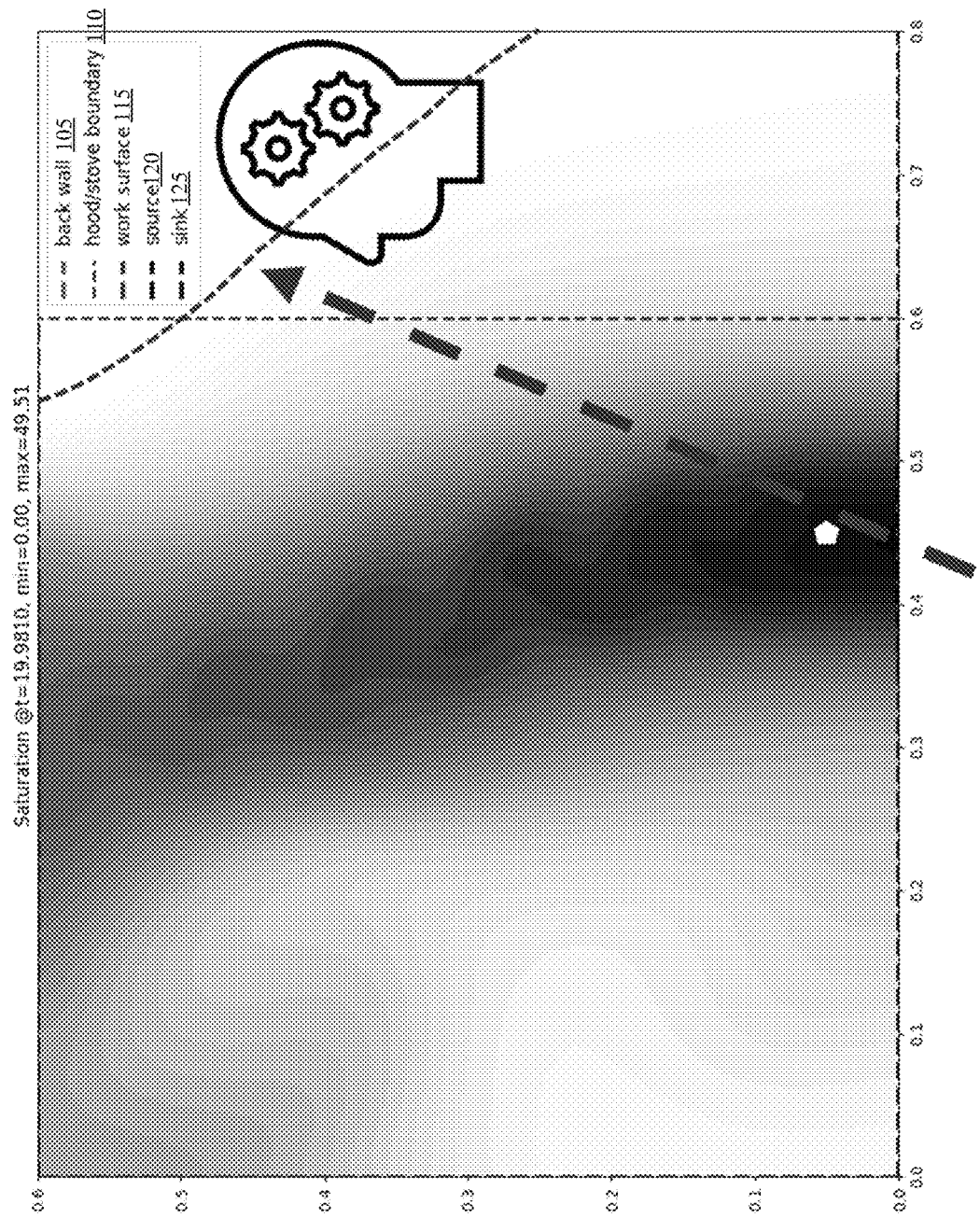
Figure 3C:
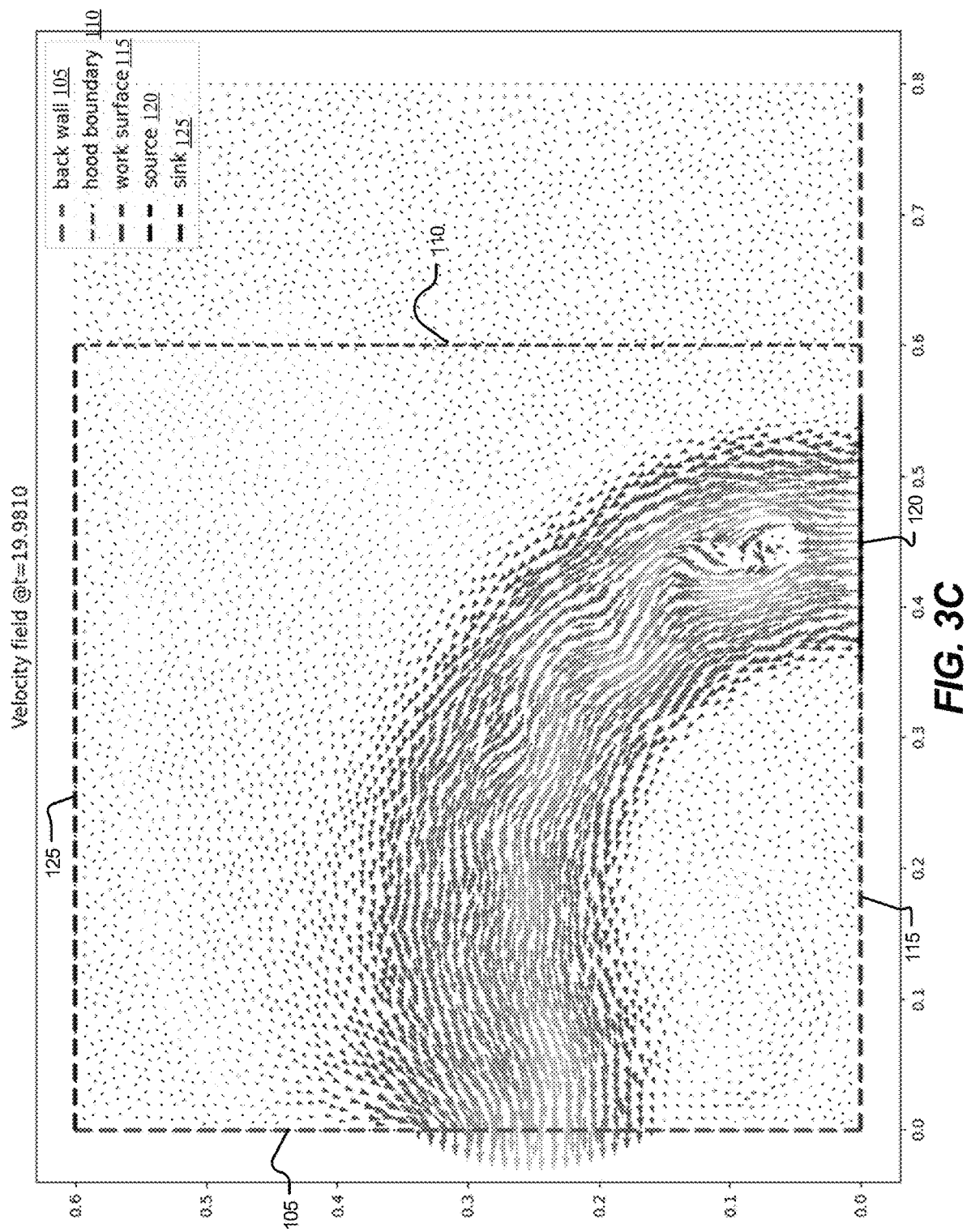
Figure 3D:
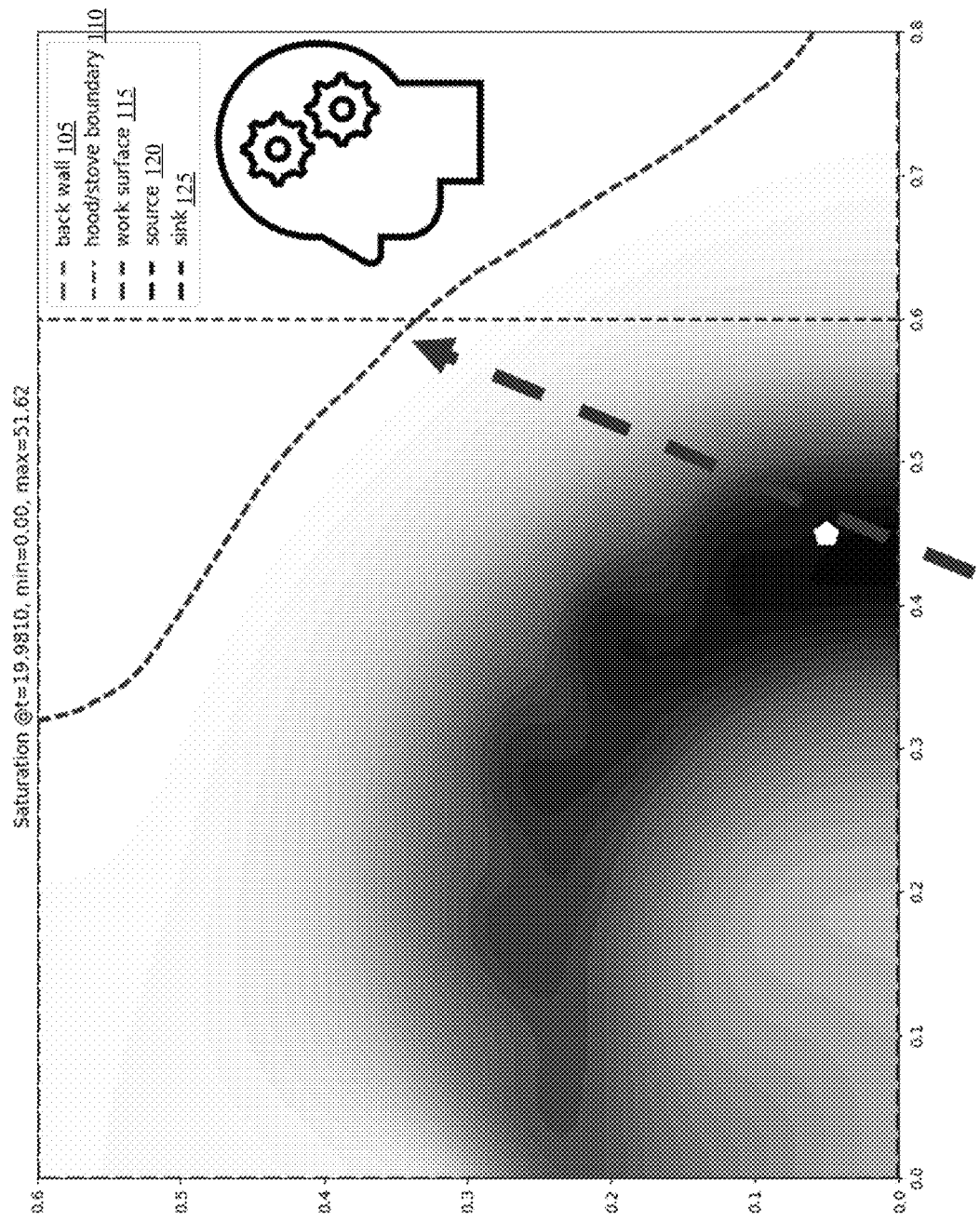
Figure 3E:
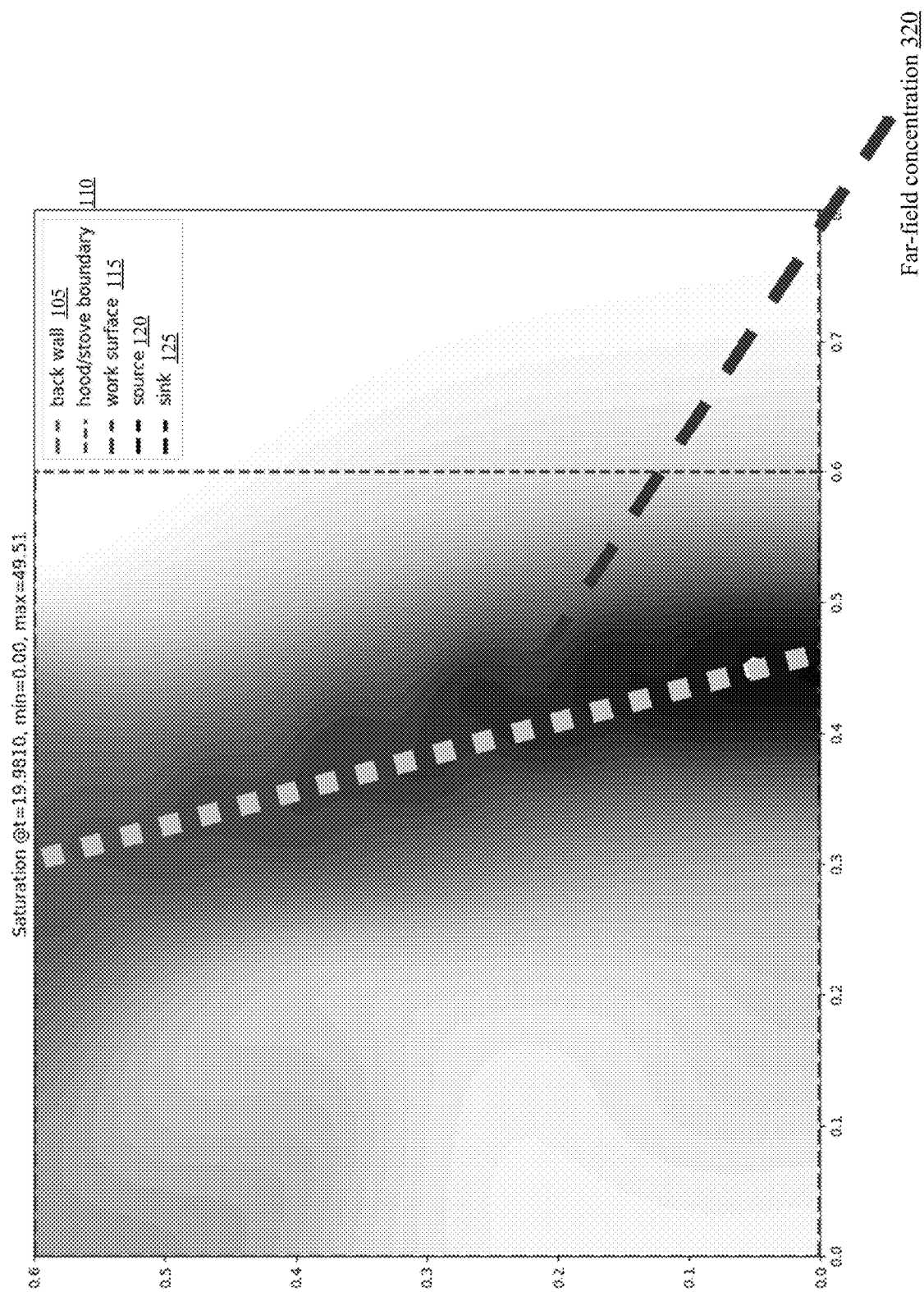
Figure 3F:
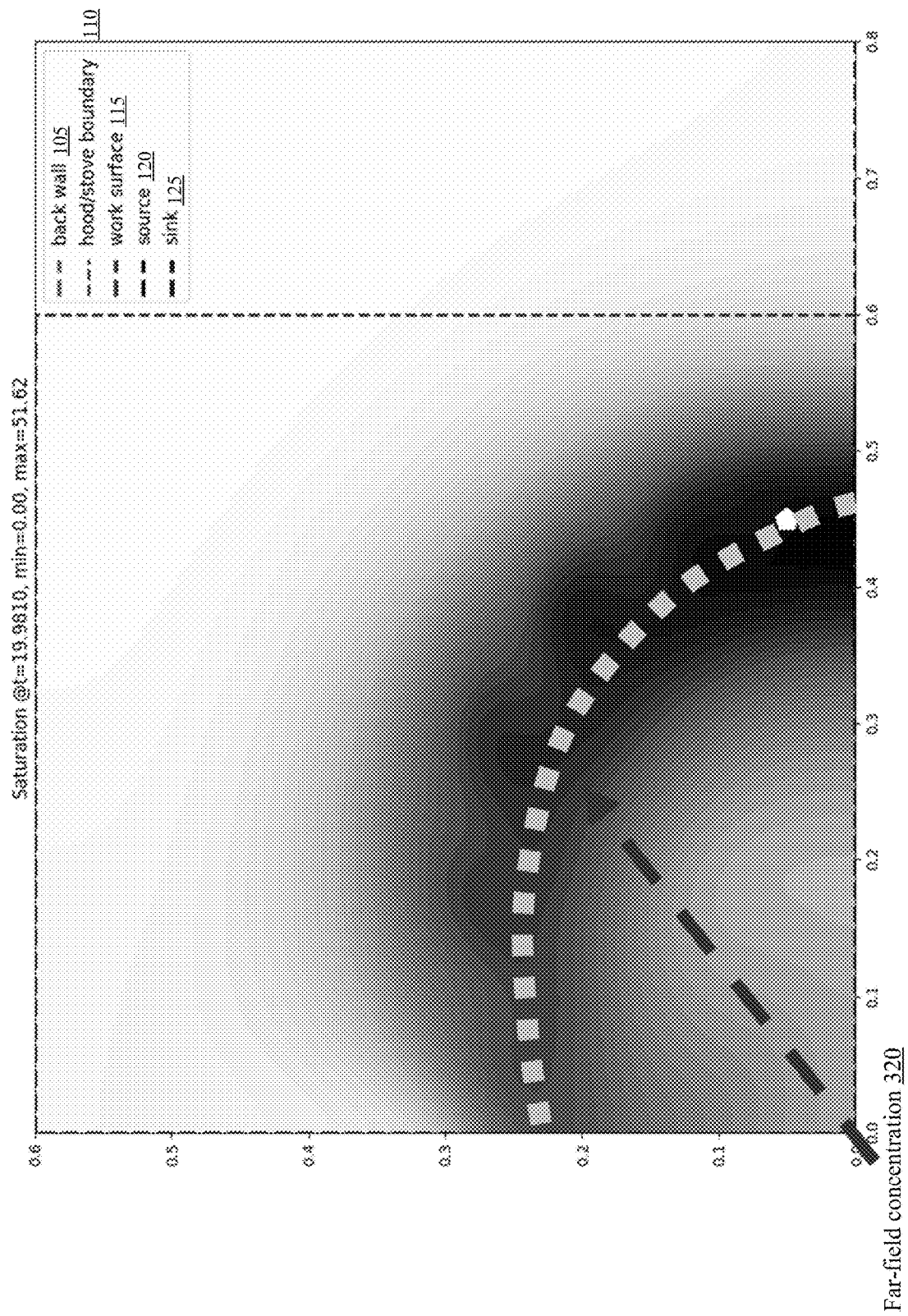

FIGS. 3A-3F illustrate example CFD simulation and convection-diffusion simulation. The CFD simulation in FIG. 3A may be based on velocity field @t=19.9810 second. The x-axis and y-axis may both reflect the distance. The convection-diffusion simulation in FIG. 3B may be based on saturation @t=19.9810 second, min=0.00, max=49.51. The x-axis and y-axis may both reflect the distance. FIG. 3B shows the near-filed perceptible pollutant concentration 310. The CFD simulation in FIG. 3C may be based on velocity field @t=19.9810 second. The x-axis and y-axis may both reflect the distance. The convection-diffusion simulation in FIG. 3D may be based on saturation @t=19.9810 second, min=0.00, max=51.62. The x-axis and y-axis may both reflect the distance. FIG. 3D shows the near-filed perceptible pollutant concentration 310. FIGS. 3E-3F illustrate an example comparison of far-field concentration. FIG. 3E corresponds to the positioning of multi-point outflows in FIGS. 3A-3B whereas FIG. 3F corresponds to the positioning of multi-point outflows in FIGS. 3C-3D. The comparison shows that far-field concentration 320 may be proportional to size of the column of exposed pollutants and use of proximal vents may reduce the effective source of diffusing substance. As demonstrated in FIGS. 3A-3F, optimal positioning of multi-point, adaptive, or distributed outflows may reduce both near-field and far-field diffusion of pollutants, compared to fixed-configuration counterparts. For example, the near-field perceptible pollutant concentration in FIGS. 3A-3B is higher than that in FIGS. 3C-3D because the positioning of multi-point outflows of FIGS. 3C-3D is better than in FIGS. 3A-3B.

As demonstrated by the numerically validated examples in FIGS. 1-3, using adaptive methodology may help achieve optimal ventilation (e.g., removal of airborne particulate, gaseous, and thermal pollution) at food processing facilities and similar thermal processing environments. In particular embodiments, optimal ventilation may be dependent on the locations of contaminant sources (e.g., foodstuffs or other substances undergoing thermal treatment) relative to the ventilation system and each other, their chemical composition, physical properties, and processing parameters, such as temperature, duration, and treatment cycles. Optimal performance may be achieved by dynamically adjusting active (e.g., fans and heat exchangers) and passive (e.g., linear diffusors and bounding surfaces) system components. Adjustable parameters may comprise variable geometry for both passive and active elements, as well as flowrates and thermal settings for multiple or distributed active devices. While contemporary ventilation designs may recognize the relative advantages of different configurations, conventional ventilation systems that implement those designs may have limited real-time configurability that typically includes only variable-flowrate air intakes. As a result, the performance of such ventilation systems may be highly sensitive to changes of the assumed operating conditions. By contrast, the ventilation system disclosed herein may leverage advances in computational science, automation, and miniaturization to implement air quality and pollution control systems, thereby having a technical advantage of being capable of adaptive real-time adjustment of the aforementioned adjustable parameters associated with a thermal processing environment, comprising geometric, mechanical, and thermal characteristics. As a result, the ventilation system may achieve optimal, or near-optimal, performance in response to given operating conditions.

Figure 4:
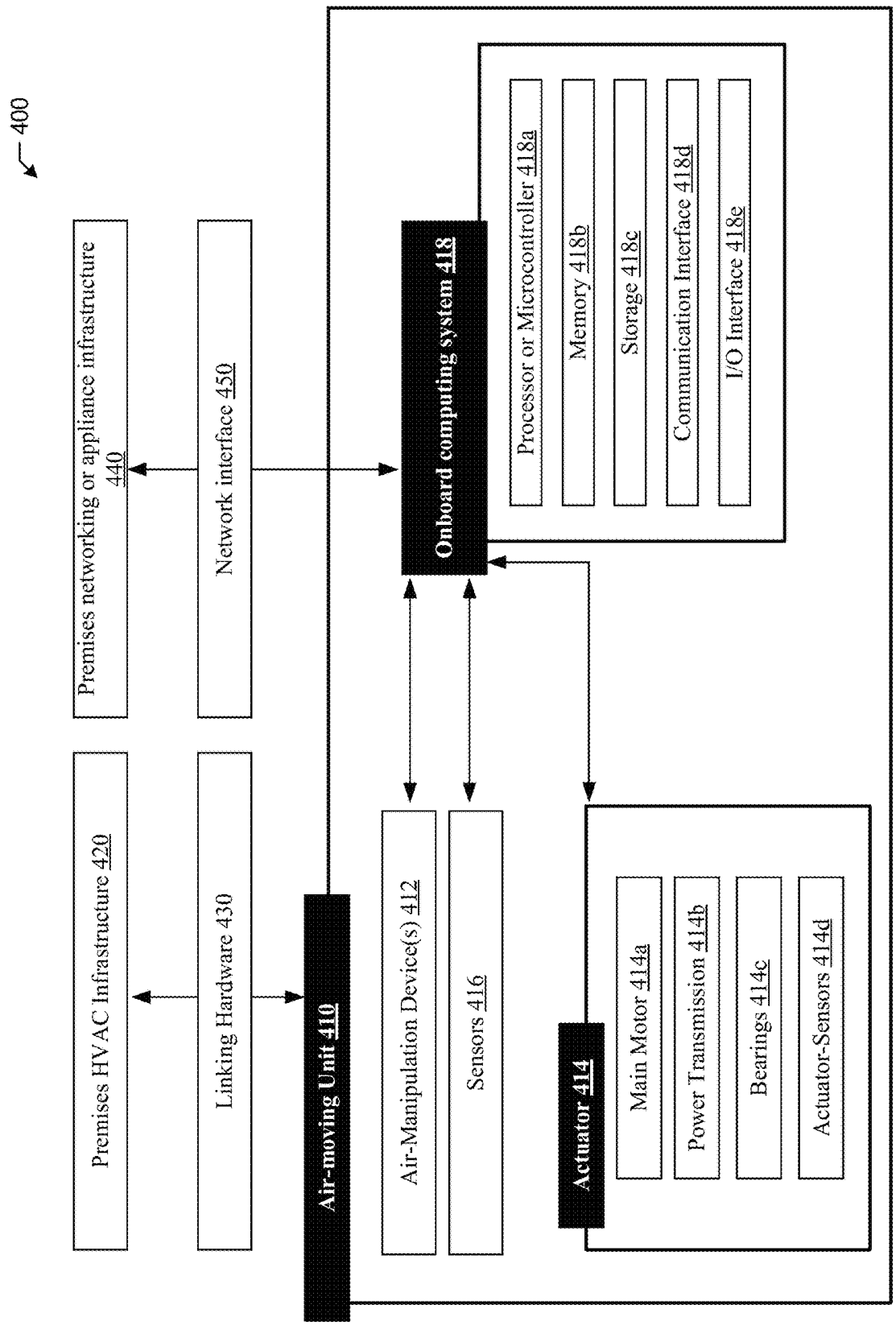
FIG. 4 illustrates an example architecture of a ventilation system.

FIG. 4 illustrates an example architecture of a ventilation system 400. In particular embodiments, the ventilation system 400 may comprise one or more air-moving units 410, which may comprise one or more air-manipulating devices 412. As an example and not by way of limitation, the air-manipulating devices 412 may comprise one or more of an axial fan, a centrifugal fan, a turbine, an air curtain, an air knife, an adjustable damper, a resistive heater, a humidifier, a dehumidifier, a radiator, a heating coil, a heat exchanger, a pump, or an air-manipulating device based on ionization or other electromagnetic principles. The air-manipulating devices 412 may have adjustable parameters, such as, without limitation, speed, temperature, pressure. The location of an air-manipulating device 412 may be dynamically adjusted in at least one degree-of-freedom via an actuator 414. In particular embodiments, the actuator 414 may comprise a main motor 414a, a power transmission 414b, bearings 414c, and actuator-sensors 414d. As an example and not by way of limitation, the main motor 414a may be an electric motor (e.g., stepper, brushless, brushed, induction), a pneumatic motor, a hydraulic actuator, a pneumatic piston, or a hydraulic pump; the power transmission 414b may be leadscrew/nut, rack and pinion gearing, spur gears, herringbone gears, roller gears, sprocket/chain, belt/pulley, or linkages; bearings 414c may be sleeve bushings, recirculating ball bearing linear guides, V-wheel-based linear bearings, roller bearings, or angular contact bearings; actuator-sensors 414d may comprise an encoder, current sensor at motor, strain gauge, external RGB camera, external DVS camera, external depth camera.

In particular embodiments, one or more sensors 416 may be integrated into the ventilation system 400 in order to determine the optimal speed and location of each air-manipulating device 412, and optimal settings of thermal devices, as well as an autonomous control system that may interact with the sensors 416, air-manipulating devices 412 and thermal devices. As an example and not by way of limitation, the sensors 416 may comprise one or more of an air quality sensor (e.g., a laser-based particular sensor measuring particulate concentration for air quality), a hygrometer measuring humidity for air quality, a thermocouple measuring temperature, a thermistor measuring temperature, an IR-based thermal camera measuring temperature, a vane anemometer, a hot wire anemometer measuring flow velocity, an RGB camera measuring contaminant source with 2D and/or 3D scanning, a depth camera, a stereo RGB cameras measuring contaminant source with 2D and/or 3D scanning, a structured light camera measuring contaminant source with 3D scanning, a time-of-flight camera measuring contaminant source with 3D scanning, an audio sensor, or a CO/CO2/methane sensor. The ventilation system 400 may optionally include one or more heat exchangers and one or more coolant pumps with adjustable rate. As another example and not by way of limitation, the autonomous control system may comprise programmable logic controllers, single-board computers, touchscreens, 7-segment displays, analog to digital converters, UART bus interfaces, LCD and LED displays, active and passive buzzers, speakers, buck and boost converters, relays, or integrated circuit logic chips (e.g., XOR, NAND).

In particular embodiments, an air-moving unit 410 may be attached to premises HVAC infrastructure 420 via linking hardware 430 (if applicable). As an example and not by way of limitation, the linking hardware 430 may comprise ducts, hoses, angled fittings, tee junctions, flanges, or hose clamps. Interfacing with sensors 416 and resultant control of air-manipulating device(s) 412 may be handled by an onboard computing system 418. An example of a computing system 418 is shown in FIG. 4, which may comprise a processor or microcontroller 418a, memory 418b, storage 418c, a communication interface 418d, and an I/O interface 418e. However, a computing system 418 may be more simple or complex as driven by the needs of particular air-manipulating devices 412 and sensors 416. Particular embodiments may also have the onboarding computing system interface with the premises networking or appliance infrastructure 440 (e.g., IP-based networks) via a network interface 450 (if applicable). This, for example, may allow multiple air-moving units 410 to communicate with each other.

In particular embodiments, the ventilation system 400 may be based on a mathematical model. The atmospheric and air quality conditions in an unenclosed thermal processing environment may be described as a solution to the following system of Navier-Stokes and convection (advection)-diffusion partial differential equations:

$$\frac{\partial(\rho\phi)}{\partial t} + \nabla\cdot(\rho\phi v) = \nabla\cdot(\Gamma\nabla\phi) + q_\phi \tag{1}$$

where $\phi$ is a unit conserved quantity:

$$\frac{\rho}{\rho}, v_i, T, S$$

and $q_\phi$ is a source Term. After rescaling by characteristic dimensions:

$$\frac{\partial u_i^*}{\partial u_i^*} = 0, ST\frac{\partial u_i^*}{\partial t^*} + \frac{\partial(u_i^* u_j^*)}{\partial x_j^*} = \frac{1}{\text{Re}}\Delta u_i^* - \frac{\partial p^*}{\partial x_i^*} + \frac{1}{Fr^2}\gamma_i, \tag{2}$$

$$St\frac{\partial T^*}{\partial t^*} + \frac{\partial(u_j^* T^*)}{\partial x_j^*} = \frac{1}{\text{RePr}}\Delta T^* + \text{sources}, \tag{3}$$

$$St\frac{\partial s^*}{\partial t^*} + \frac{\partial(u_j^* S^*)}{\partial x_j^*} = \frac{1}{\text{ReSc}}\Delta S^* + \text{sources}. \tag{4}$$

$$St = \frac{L_0}{v_0 L_0}, \text{Re} = \frac{\rho v_0 L_0}{\mu}, Fr = \frac{v_0}{\sqrt{L_0 g}},$$

$$Pr = \frac{C_p \mu}{k_T}, Sc = \frac{\mu}{\rho D_{diff}},$$

where $v_i$, S, T, p stand for air velocity (components), saturation of a pollutant, air temperature and pressure—all functions of time t and spatial coordinates $x_i$, i=1, 2, 3. Re, Fr, Pr, and Sc are the Reynolds, Froude, Prandtl, and Schmidt numbers that characterize the turbulent mode of ventilation, the effect of the buoyancy, the effect of turbulence on thermal conduction, and the effect of turbulence on pollutant diffusion. Note that solving equations (2-4) and their subsets and simplifications may be the standard approach in the study of fluid flows, temperature changes and pollutant concentrations in kitchen HVAC, residential and commercial premises HVAC, food processing, air quality and pollution control. In equations (2-4) we use the following notations:

$$t^* = \frac{t}{t_0}, x_i^* = \frac{x_i}{L_0}, u_i^* = \frac{v_i}{v_0}, p^* = \frac{p}{\rho v_0^2},$$

$$T^* = \frac{T - T_0}{T_1 - T_0}, S^* = \frac{S - S_0}{S_1 - S_0}, St = \frac{L_0}{v_0 t_0},$$

where $t_0$, $L_0$, $v_0$, $T_0$, $T$, $S_0$, $S_1$ are the characteristic or reference time scale (1 second), length scale (1 meter), velocity scale (1 meter/second), reference low and high air temperatures (e.g., freezing and boiling), reference low and high pollutant concentrations/water saturation. $\rho$, $\mu$, $C_p$, $k_T$ are the air density, viscosity, specific heat, thermal conductivity, and $D_{diff}$ is the mass diffusivity of a pollutant. $\gamma_i$ is the component of the normalized gravitational acceleration in the direction of coordinate $x_i$ and is used to model the buoyancy of hot air under the Boussinesq model that is standard in HVAC simulations. Optimizing the system boundaries and boundary conditions based on Navier-Stokes and convection (advection)-diffusion partial differential equations may be an effective solution for addressing the technical challenge of determining the adjustments of system boundaries as these equations may characterize adjusting the system boundaries as a mathematical model that is theoretically validated, thereby resulting in reliable adjustment considering all relevant parameters associated with a thermal processing environment.

Figure 5A:
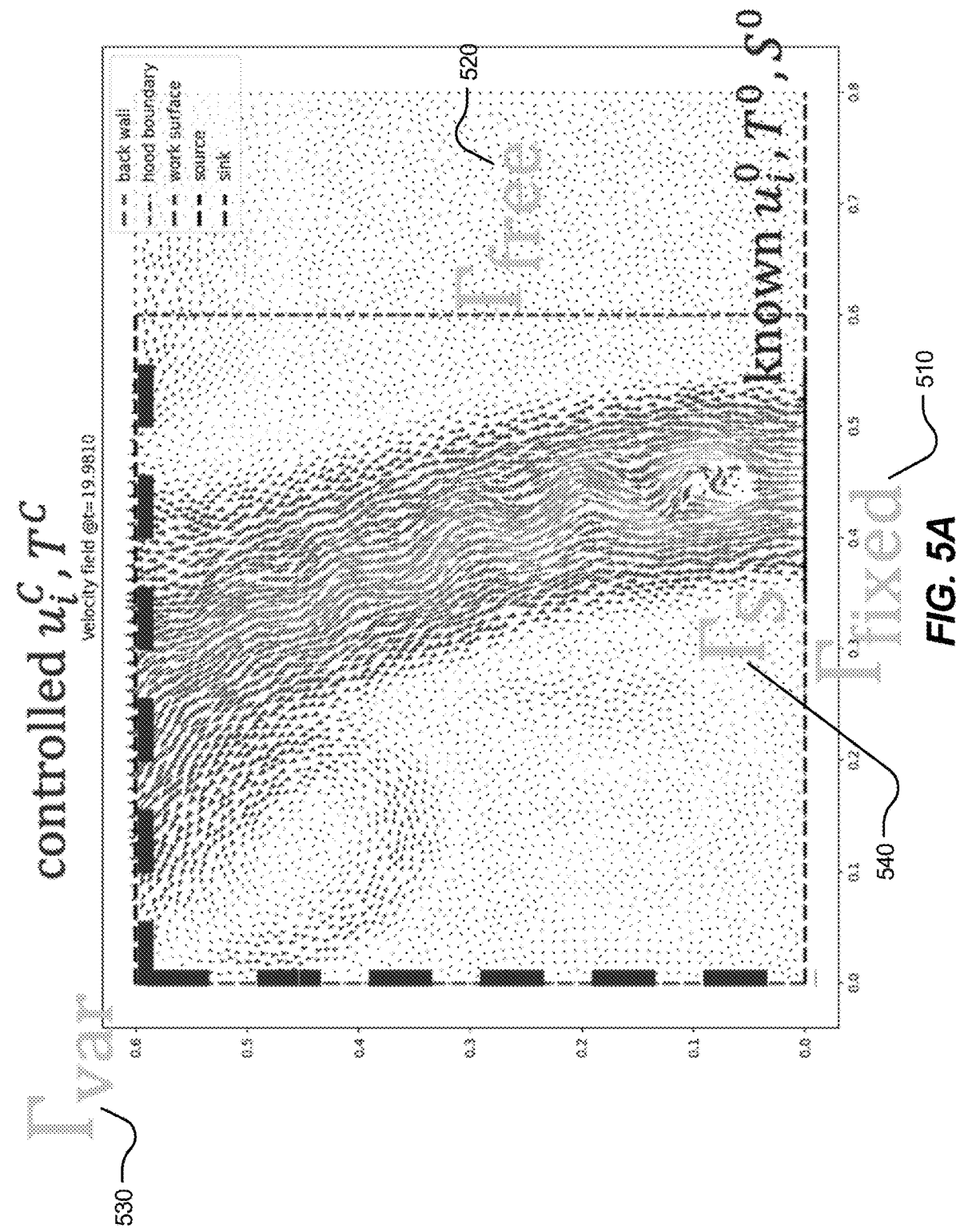
FIGS. 5A-5C illustrate example optimizations of system boundaries.
Figure 5B:
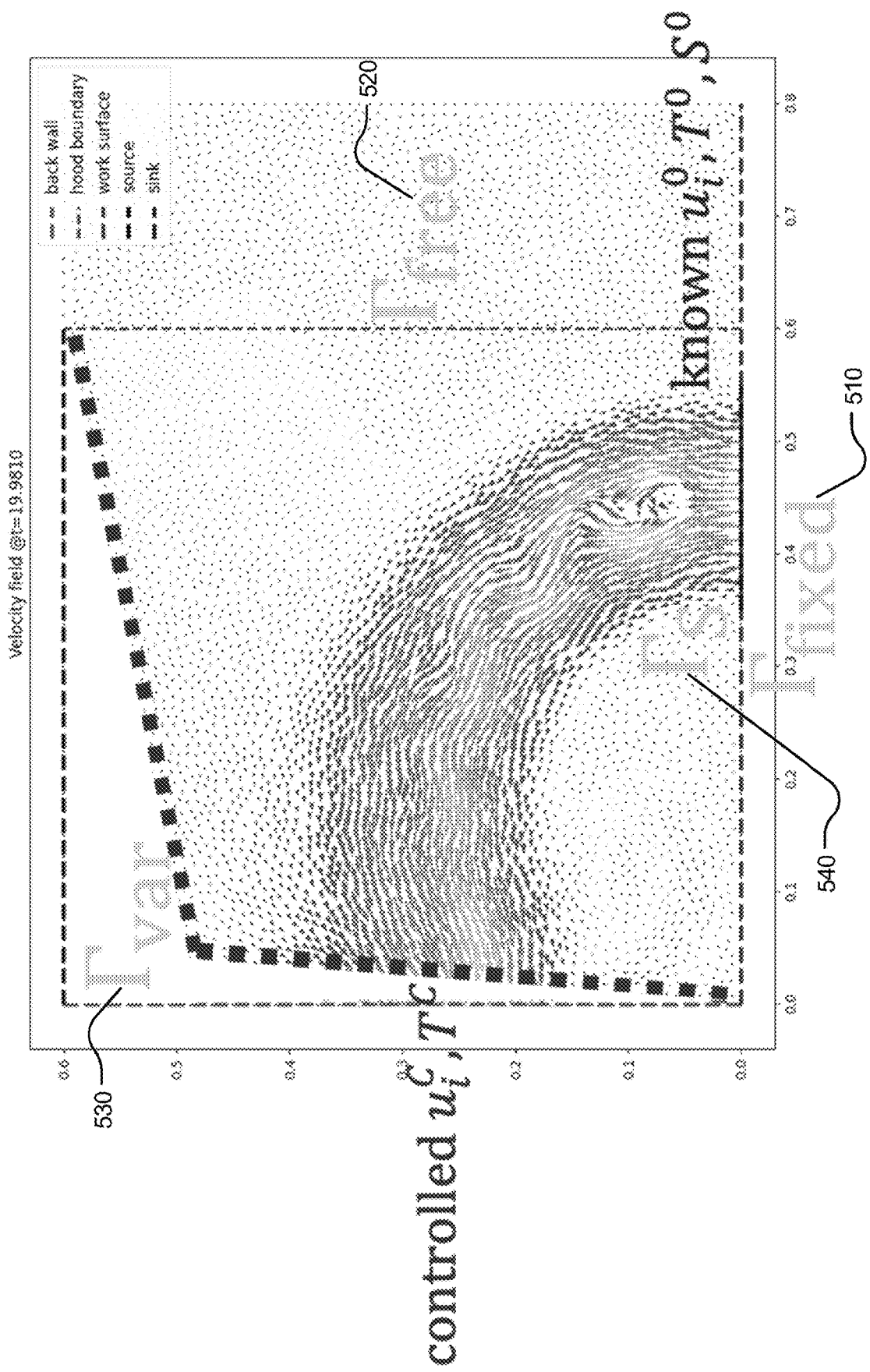
Figure 5C:
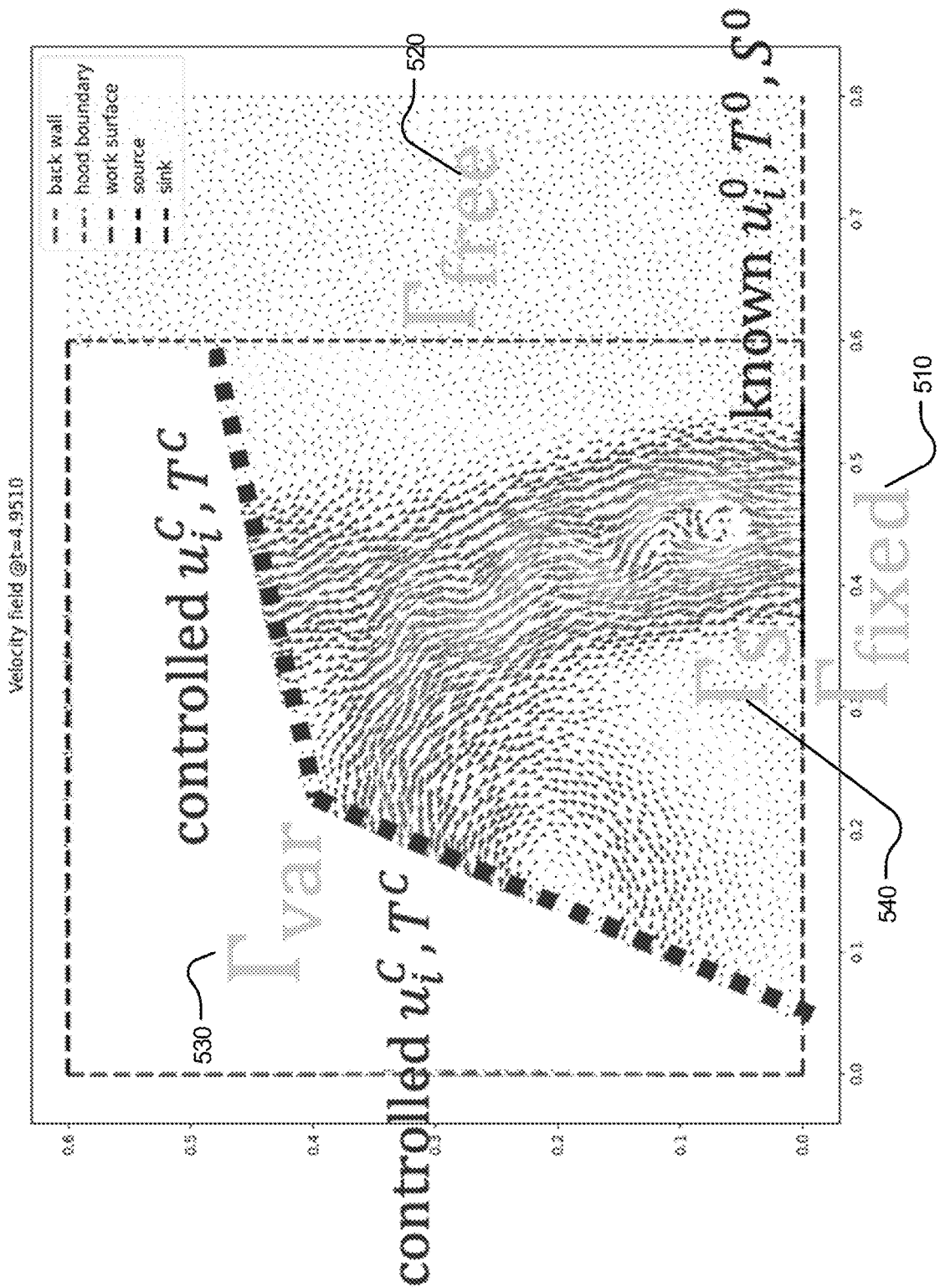

FIGS. 5A-5C illustrate example optimizations of system boundaries. Equations (2-4) are combined with boundary conditions on the system boundary $\Gamma$. The boundary of our system may be comprised of a fixed part $\Gamma_{fixed}$ 510, a free boundary part (e.g., air gaps) $\Gamma_{free}$ 520, and adjustable variable boundary $\Gamma_{var}$ 530 (see FIG. 5). The influx of contaminants may be described by boundary conditions on a source subset $\Gamma_S$ 540 (i.e., $\Gamma_S \subset \Gamma$), typically on the fixed part of the boundary, $\Gamma_S \subset \Gamma_{fixed}$, that may be a subset of the following equations, where the superscript "0" denotes the corresponding quantity at the source:

$$u_i^* = u_i^0, i=1,2,3, T^* = T^0, S^* = S^0, \text{for } x \in \Gamma_s. \quad (5)$$

The quantities in the right-hand side of equations (5) may come from exact measurements or approximate estimates from sensory data. We optimize an arbitrary cost functional of solution to equations (2-4):

$$\text{minimize} F(u_1^*, u_2^*, u_3^*, S^*, T^*) \quad (6)$$

by changing the shape $\Gamma_{var}$ of the variable boundary $\Gamma_{var}$ and the boundary conditions on it (the superscript "C" stands for controlled quantity):

$$u_i^* = u_i^c, i=1,2,3, T^* = T^c, \text{for } x \in \Gamma_{var} \quad (7)$$

In particular embodiments, given a set of pollutants with various diffusivity coefficients and density (e.g., molecular odorants such as mercaptan, particulate matter such as PM 2.5, water vapor, odorless pollutants such as methane, carbon monoxide, carbon dioxide), and given known or estimated source locations and rates of influx for the pollutants illustrated in equation 5, the ventilation system 400 may modify the boundary conditions based on equation 7 and variable-geometry part of system boundary $\Gamma_{var} \subset \Gamma$ to optimize a numerical cost function based on equation 6 that measures the level of pollution/comfort in the environment. This may be performed using numerical optimization methodology referred to as "PDE-based optimization and optimal control" and numerical solution of PDE (e.g., using finite elements or finite differences) and translated into a flow diagram or instruction set for a programmable logic or alternative controller built into the ventilation system 400. The actual optimal control problem (i.e., equations 2-7) may or may not be solved in real time. Without limitation, when the cost functional (6) is a cumulative measure of pollution $F = \Sigma s(x_{target}, t_{target})$ for target locations and times, we may get the embodiment disclosed herein.

Figure 6A:
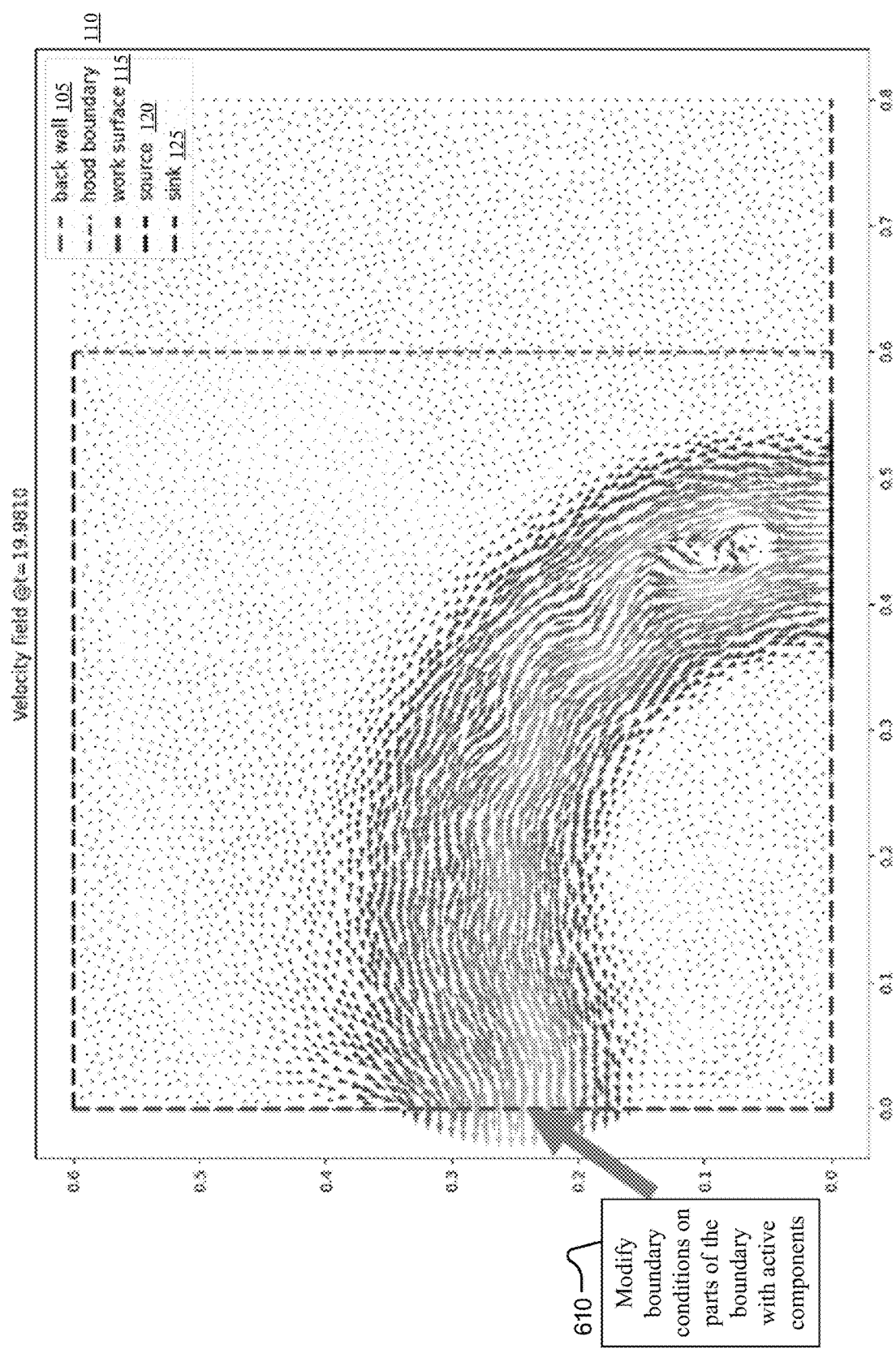
FIGS. 6A-6B illustrates example CFD simulation and convection-diffusion simulation with modifications of system parameters.
Figure 6B:
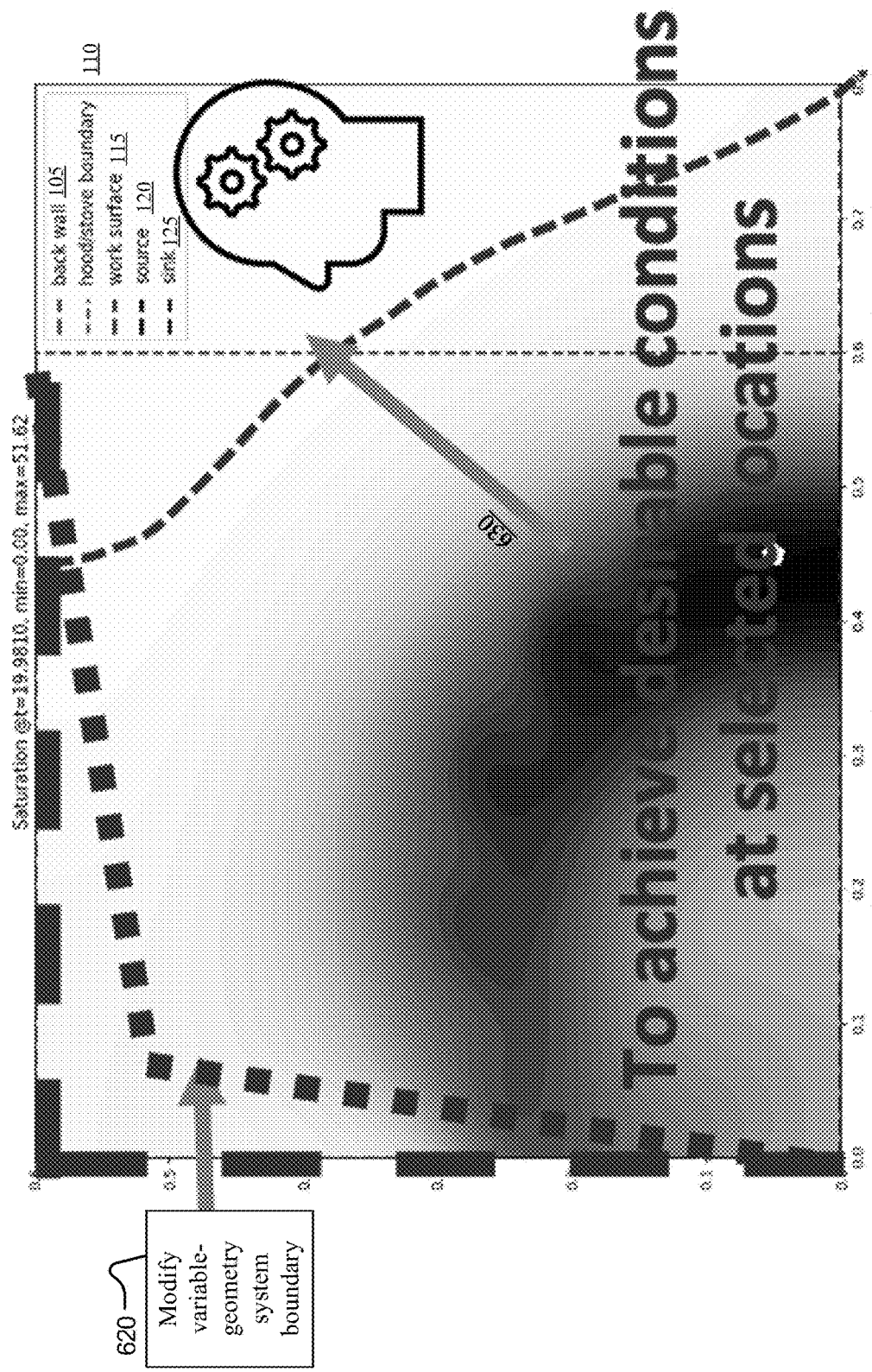

FIGS. 6A-6B illustrate example CFD simulation and convection-diffusion simulation with modifications of system parameters. As demonstrated in FIG. 6A, the ventilation system 400 may modify boundary conditions 610 (e.g., velocity, pressure and temperature) on parts of the boundary with active components (e.g., fans, heaters, heat exchangers). As demonstrated in FIG. 6B, the ventilation system 400 may modify variable-geometry system boundary 620 to achieve desirable conditions at selected locations 630.

Figure 7:
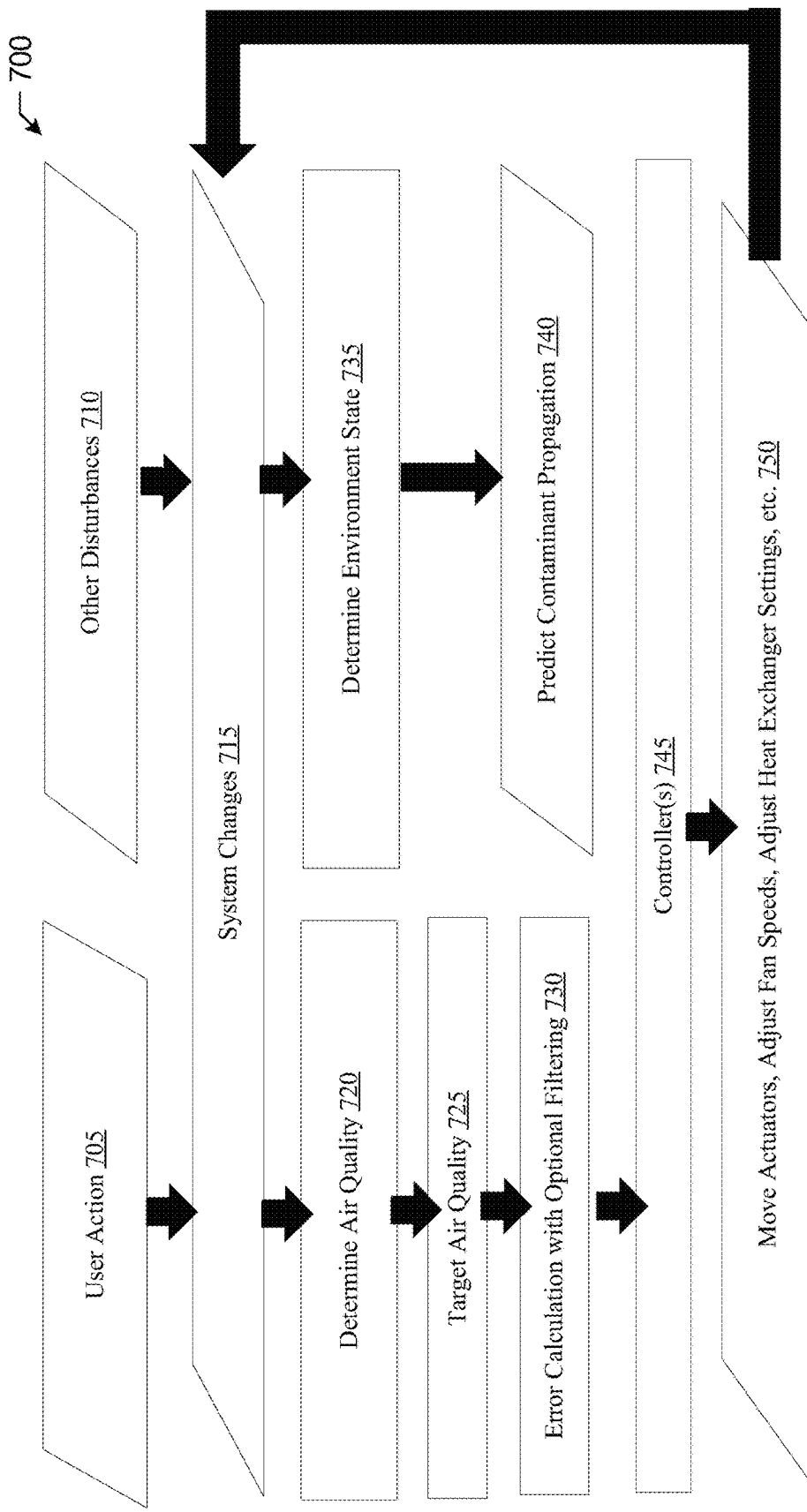
FIG. 7 illustrates an example flow diagram for real-time adaptive air quality and pollution control.

FIG. 7 illustrates an example flow diagram 700 for real-time adaptive air quality and pollution control. In particular embodiments, the ventilation system 400 may determine, based on the sensor data, one or more user actions 705 within the kitchen environment. The ventilation system 400 may also detect other disturbances 710. As an example and not by way of limitation, a user action 705 may comprise adding ingredients, moving pots to different burners, etc. As another example and not by way of limitation, other disturbances 710 may comprise someone opening the fridge. The user action 705 and/or other disturbances 710 may be considered as system changes 715. Responsive to the system changes 715, the ventilation system 400 may determine air quality 720. As an example and not by way of limitation, the determination may be based on PM 2.5, humidity, temperature, etc. The ventilation system 400 may then determine/access a target air quality 725. Based on the target air quality 725, the ventilation system 400 may perform error calculation with optional filtering 730. In particular embodiments, the ventilation system 400 may also determine environment state 735 responsive to the system changes 715. As an example and not by way of limitation, the environment state may comprise the number of pots, pot sizes, heat settings, pot contents, etc. In particular embodiments, the ventilation system 400 may determine the one or more adjustments based on the current air quality 720, the environment state 735, and the one or more user actions 705. Based on the determined environment state 735, the ventilation system 400 may predict contaminant propagation 740. The calculated error with optional filtering and predicted contaminant propagation may be provided to the controller(s) 745. The controller(s) 745 may then move actuators 414, adjust fan speeds, adjust heat exchanger settings, etc. 750. Determining the adjustments based on the current air quality 720, the environment state 735, and the user actions 705 may be an effective solution for addressing the technical challenge of effectively determining adjustments of system boundaries and air-manipulating devices as these variables may enable the ventilation system 400 to predict contaminant propagation and calculate error with optional filtering, both of which may be used to determine the adjustments to achieve a target air quality 725.

Figure 8:
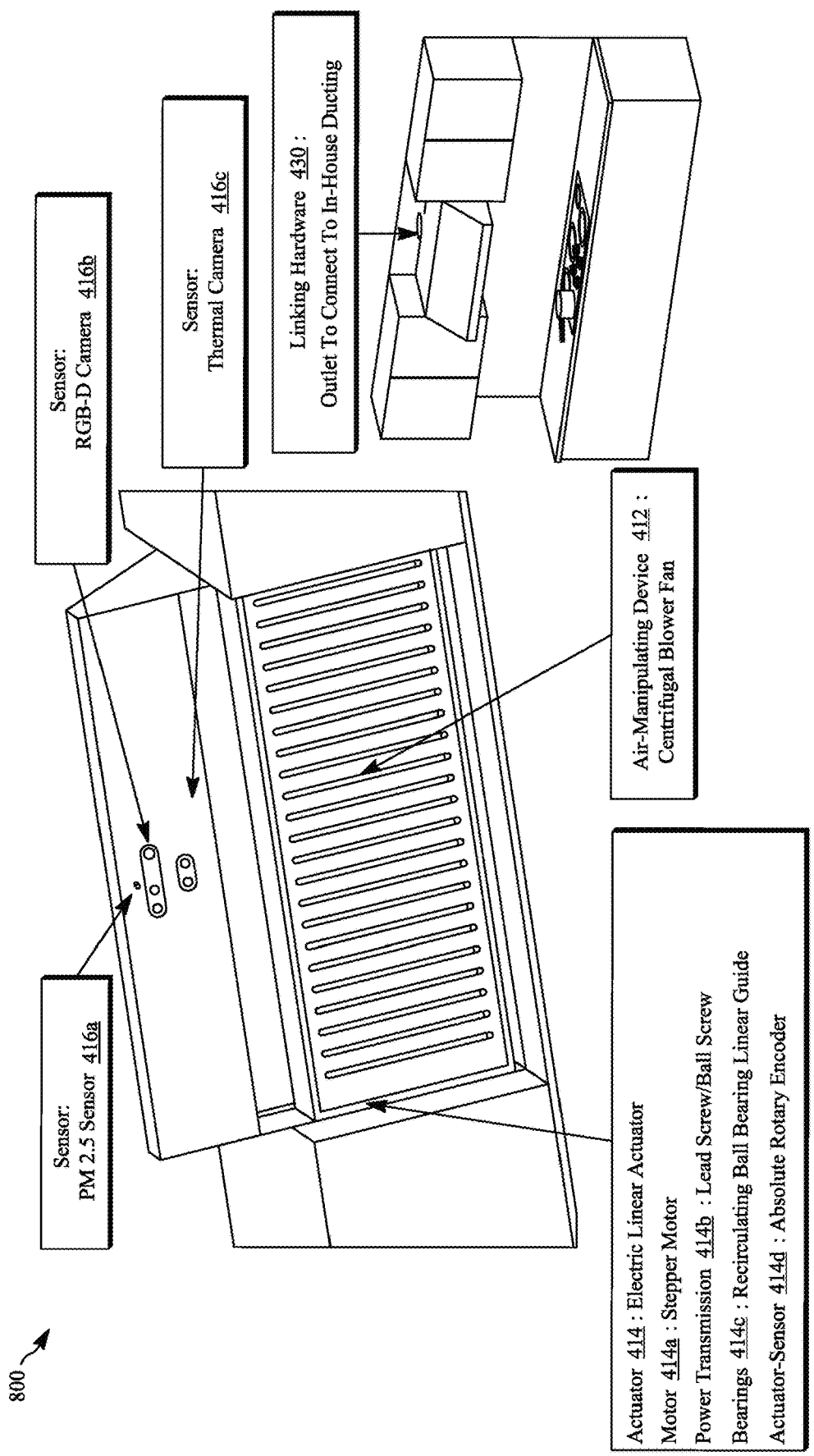
FIG. 8 illustrates an example implementation of the ventilation system.

FIG. 8 illustrates an example implementation 800 of the ventilation system 400. In particular embodiments, the ventilation system 400 may comprise a single air-moving unit 410 with a single air-manipulating device 412 with adjustable speed and whose location may be dynamically adjusted in one degree-of-freedom via an actuator 414. For example as illustrated in FIG. 8, the air-manipulating device 412 may comprise a centrifugal blower fan and the actuator 414 may be an electric linear actuator comprising a motor 414a of stepper motor, a power transmission 414b of lead screw/ball screw, bearings 414c of recirculating ball bearing linear guide, and an actuator-sensor 414d of absolute rotary encoder. One or more sensors 416 may be integrated into the system in order to determine the optimal speed and location of each air-manipulating device 412. For example as illustrated in FIG. 8, one sensor may be a PM 2.4 sensor 416a, another sensor may be an RGB-D camera 416b, and another sensor may be a thermal camera 416c. The air-moving unit 410 may be connected to premises HVAC infrastructure 420 via the linking hardware 430, which may be an outlet to connect to in-house ducting as illustrated in FIG. 8.

In particular embodiments, the ventilation system 400 may be integrated in a kitchen hood in the kitchen environment. The kitchen hood may be positioned over a cooktop. As an example and not by way of limitation, the ventilation system 400 may be implemented as a standard form-factor "under-the-cabinet" kitchen hood, in which the ventilation fan (i.e., the air-manipulating device 412) may have variable speed and move dynamically in one linear axis via a stepper motor-based linear actuator 414, both actions which may be adjusted based on feedback from an RGB-D camera 416b and a thermal camera 416c. In particular embodiments, these sensors 516 may be used individually or in combination.

In particular embodiments, the implemented ventilation system 400 in FIG. 8 may adapt air quality and control pollution according to the flow diagram 700 as follows. Suppose a user is cooking a sauce in a pot at the front burner. The user turns the hood on, and the fan/fan enclosure may be in a default position for the beginning of every process. This default position may be fixed (e.g., set at the factory) or determined by the integrated sensors 416 or determined by a calibration sequence during installation via external sensors (e.g., using an included external sensor device or the user's existing smartphone). Such a calibration sequence may improve the performance of the default position, as the system may have a better initial understanding of the boundary conditions.

Using the depth and 2D image data from the RGB-D camera 416b, in conjunction with the thermal camera 416c and PM 2.5 sensor 416a, the control system may identify the size of the pot and determine the user is cooking a sauce. The environment state may include information such as the presence of people or pets. This information may be used by the controller 745 to determine safe actions or actions which may be more preferable for user experience. In particular embodiments, the environment state may be sent to a model, which may then output an initial target position and speed for the fan. This model may be determined through experimentation, simulation, machine learning, or any combination of those methods. The target initial position and speed may be used as inputs for closed loop controllers 745 (e.g., PID, LQR, etc.) and the fan may change speed and the actuator 414 may move accordingly.

Figure 9:
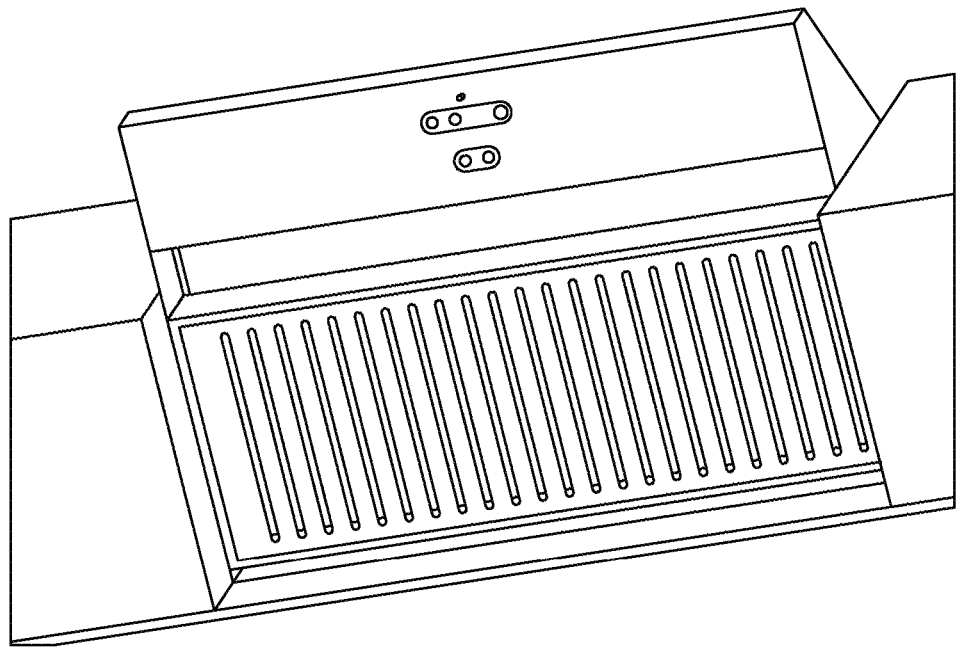
FIG. 9 illustrates an example moving to the initial target position.
Figure 9:
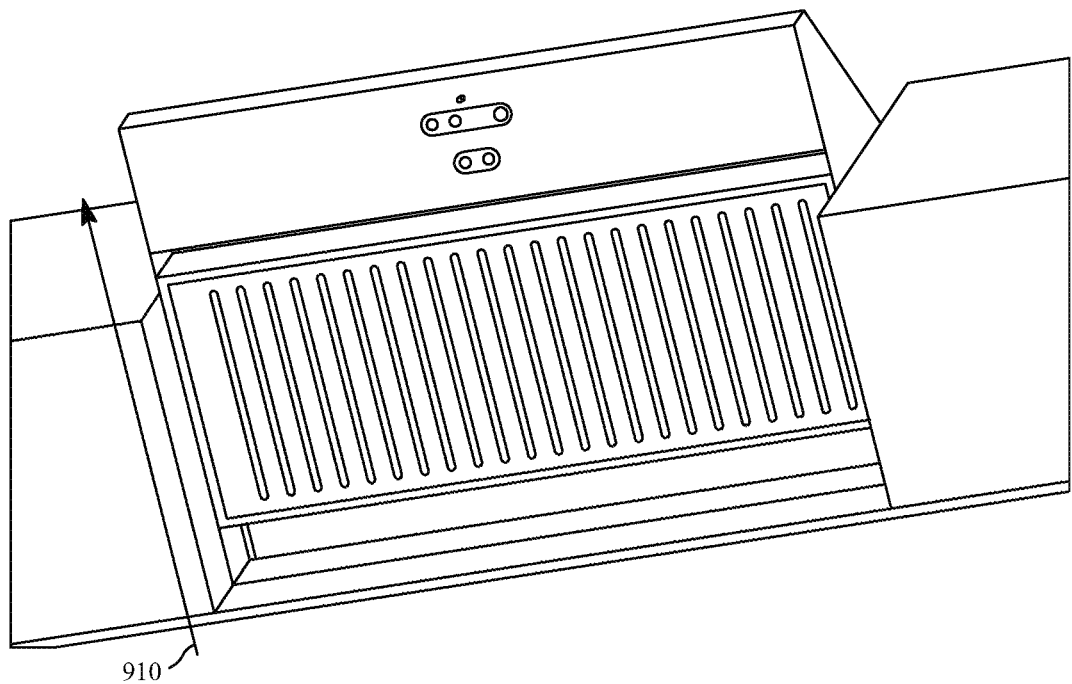

In particular embodiments, adjusting the one or more air-manipulating devices 412 may comprise one or more of modifying a position or pose of one or more of the air-manipulating devices 412, modifying one or more operation setting of one or more of the air-manipulating devices 412, or moving one or more of the air-manipulating devices 412 based on a two-degree-of-freedom movement along both a rotary axis and a linear axis. FIG. 9 illustrates an example moving to the initial target position. As demonstrated in FIG. 9, the actuator 414 may move the fan to the initial target position in a direction indicated by the arrow 910.

Figure 10:
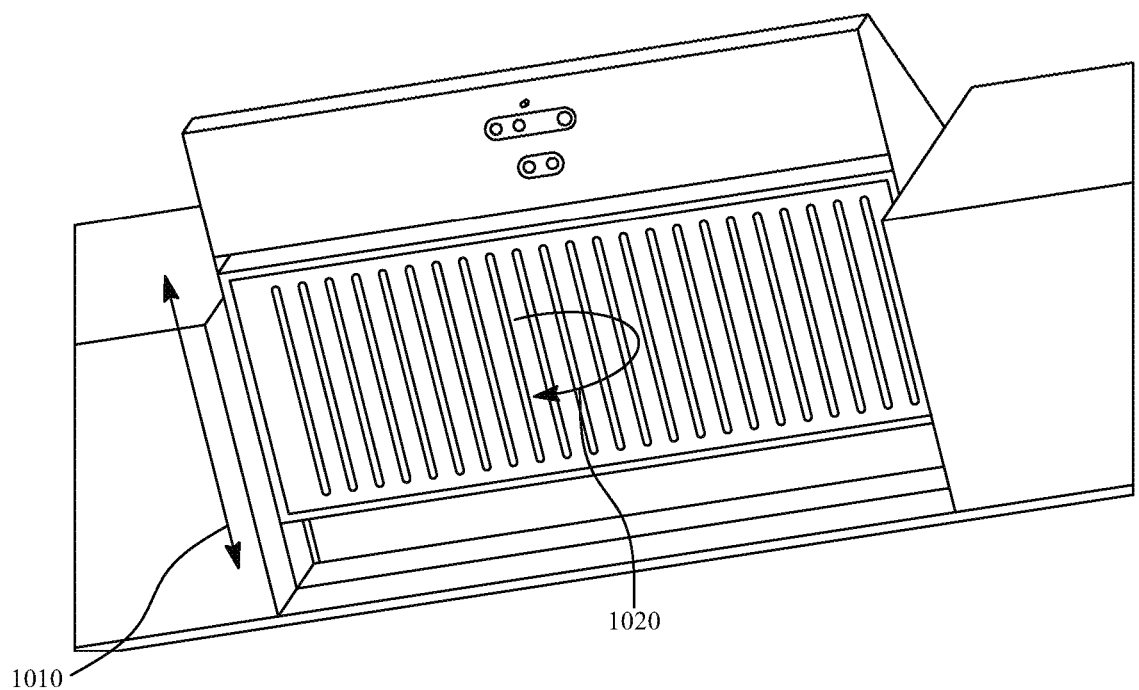
FIG. 10 illustrates an example moving based on air quality.

In particular embodiments, a pre-programmed (potentially updatable) target air quality 725 may be built into the system and may be used for fine adjustments during the cooking process. This target air quality 725 may be also used as part of the closed loop position for fan speed and position. In this system, air quality may be determined via temperature and particulate readings from the thermal camera 416c and PM 2.5 sensor 416a respectively. Greater control and ventilation performance may be achieved by sensing and controlling other air quality parameters, such as humidity. FIG. 10 illustrates an example moving based on air quality. In particular embodiments, the actuator 414 may move and the fan may change speed in order to maintain the ideal air quality. As demonstrated in FIG. 10, the actuator 414 may move back and forth along the directions indicated by the arrow 1010 and the fan may change the speed of the rotation indicted by the arrow 1020.

At regular intervals during the cooking process, the hood may again use the depth and 2D image data from the RGB-D camera 416b, in conjunction with the thermal camera 416c and PM 2.5 sensor 416a, to see if new pots/pans have been introduced to the cooktop/stovetop or if any pots and pans have been moved or to identify substantial changes in the cooked substance.

In particular embodiments, ambient conditions may be critical to optimally controlled ventilation. As such, random disturbances 710, such as someone opening the fridge, may also cause system changes 715. Our adjustable hood system may be more robust to these changes versus a standard, fixed hood. For safety and/or user experience purposes, the controller logic may also output different commands if a person (e.g., the user who is cooking) is detected in the environment state.

Figure 11:
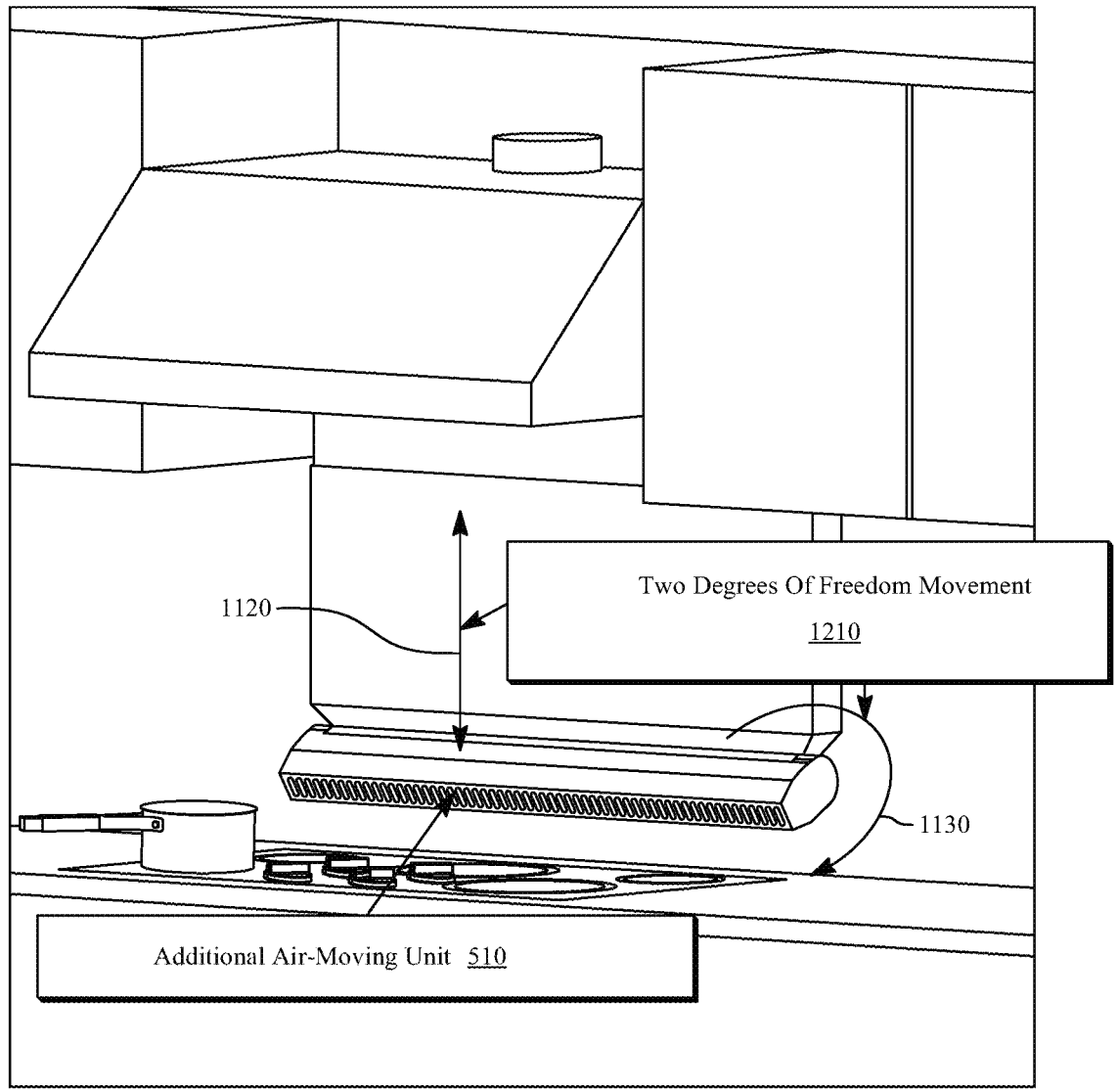
FIG. 11 illustrates another example implementation of the ventilation system.

In particular embodiments, the ventilation system 400 may be implemented as a more complex system identical to the one illustrated in FIG. 8 but with an additional air-moving unit 410 with two degrees of freedom (i.e., one rotary axis and one linear axis). FIG. 11 illustrates another example implementation of the ventilation system 400. The additional air-moving unit 410 may move according to two degrees of freedom movement 1110, e.g., up-and-down 1120 and rotation 1130.

Figure 12A:
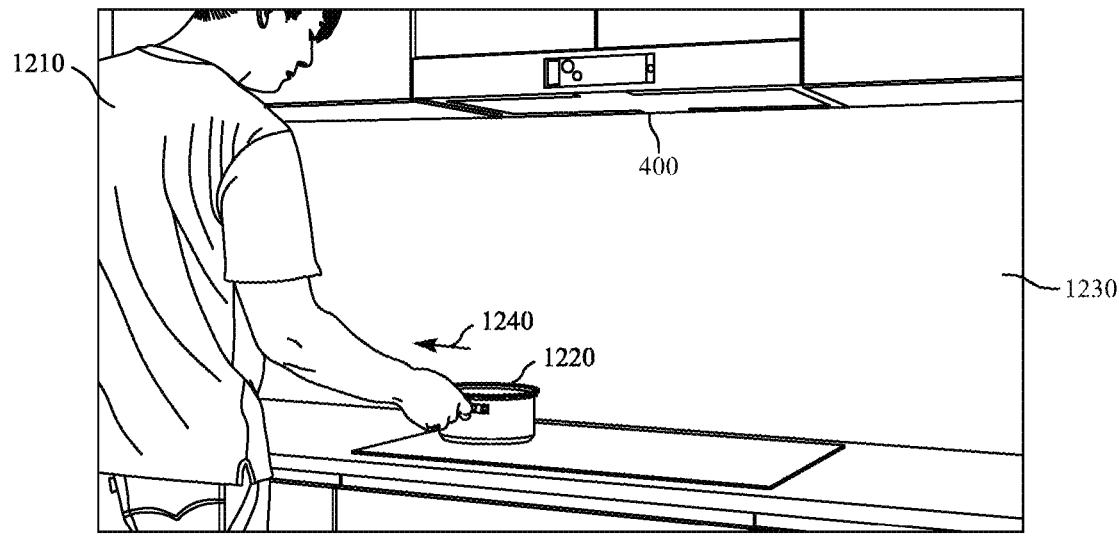
FIGS. 12A-12B illustrate example scenario of real-time adaptive air quality and pollution control.
Figure 12B:
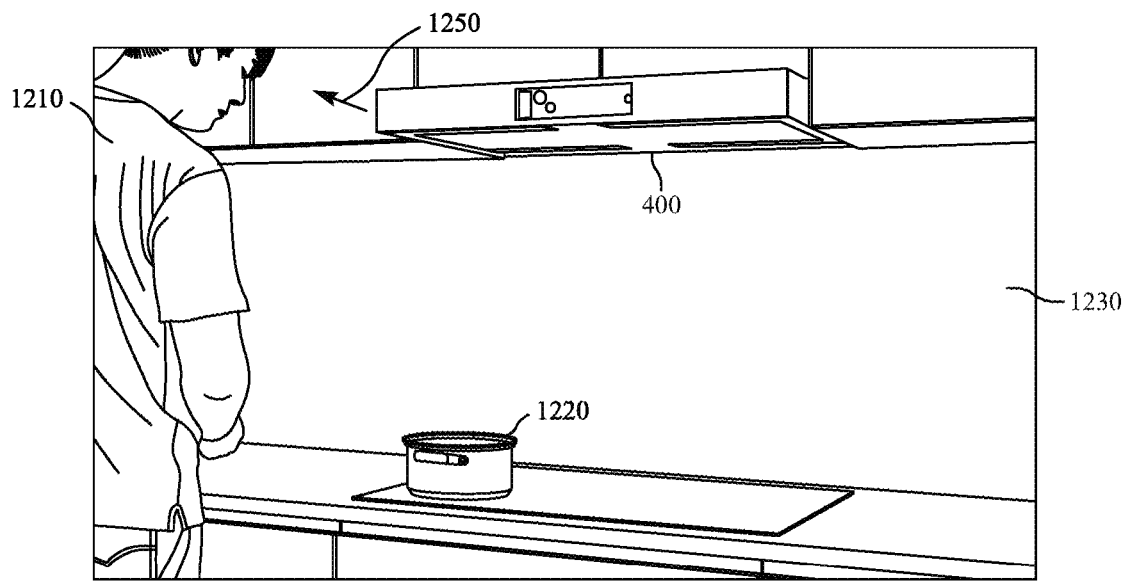

FIGS. 12A-12B illustrate example scenario of real-time adaptive air quality and pollution control. As illustrated in FIGS. 12A-12B, a user 1210 may be cooking in the kitchen. FIG. 12A illustrates that the user 1210 may be moving the pot 1220 from a burner close to the kitchen wall 1230 towards a burner close to the user 1210, as indicated by the arrow 1240. FIG. 12B illustrates that after the pot 1220 has been moved the burner close to the user 1210, the ventilation system 400 may perform real-time adaptive air quality and pollution control responsive to such change of the pot 1220. As an example and not by way of limitation, the actuator 414 may extend out along the direction indicated by the arrow 1250.

The embodiments disclosed herein may be used wherever ventilation of the space is required. As an example and not by way of limitation, use cases for the embodiments disclosed herein in consumer appliances may include more controlled space ventilation by identifying sources of pollution, automatic recognition of air pollution sources, prediction of contaminant propagation, adaptive speed of fan and suction for effective ventilation, purification and circulation, determination of environment state, etc. The embodiments disclosed herein may be also used in any indoor facility where humans may be exposed to thermal, particulate, and gaseous pollutants produced as a result of thermal processing/treatment conducted at such facility. As an example and not by way of limitation, such use cases may include residential/commercial kitchens, bathrooms with ventilation for steam and vapor, labs with fumes, etc.

Figure 13:
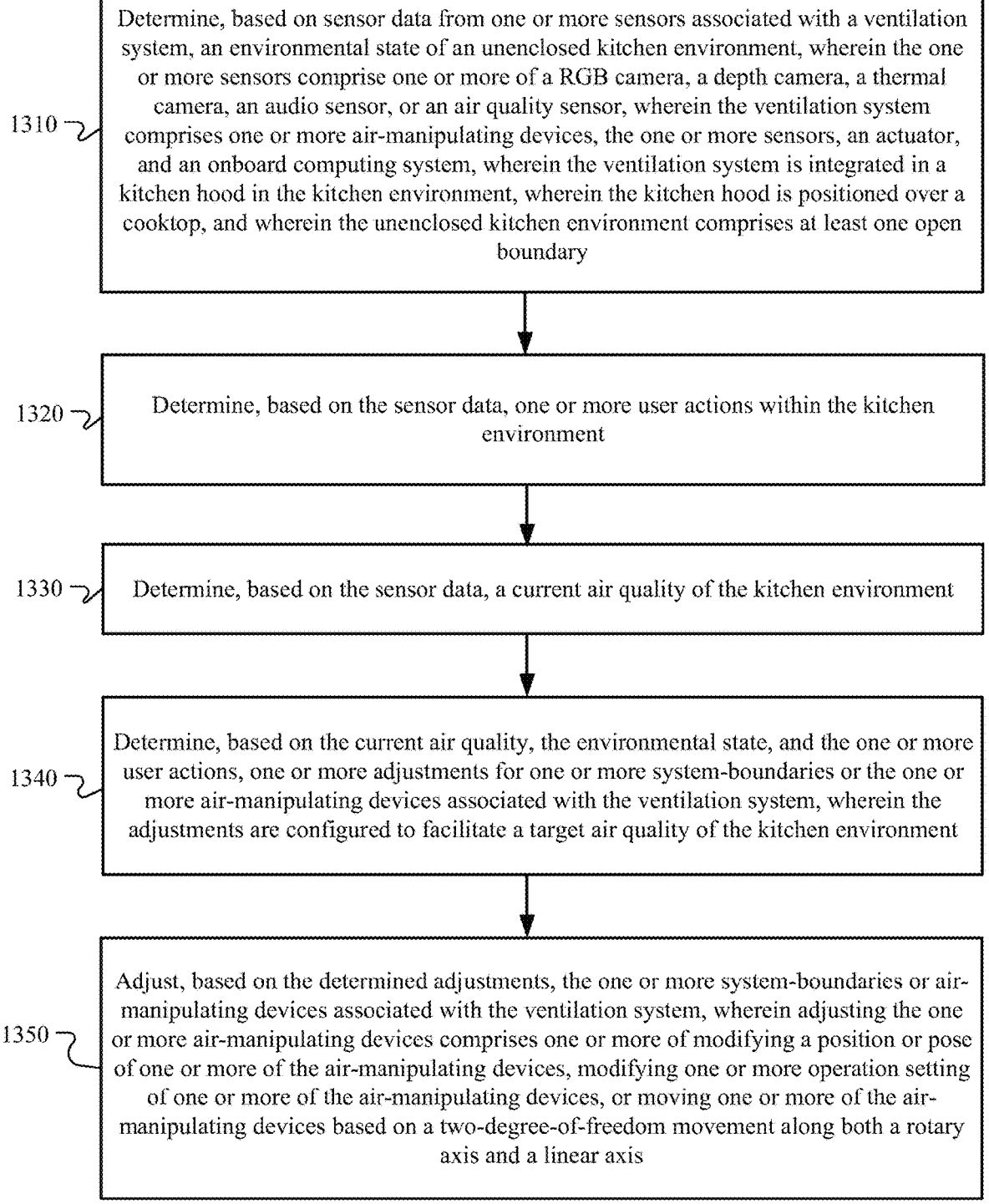
FIG. 13 illustrates an example method for real-time adaptive air quality and pollution control.

FIG. 13 illustrates is a flow diagram of a method 1300 for real-time adaptive air quality and pollution control, in accordance with the presently disclosed embodiments. The method 1300 may be performed utilizing one or more processing devices (e.g., the ventilation system 400) that may include hardware (e.g., a sensor, an air-manipulating device, a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing sensor data, software (e.g., instructions running/executing on one or more processors), firmware (e.g., microcode), or some combination thereof.

The method 1300 may begin at step 1310 with the one or more processing devices (e.g., the ventilation system 400). For example, in particular embodiments, the ventilation system 400 may determine, based on sensor data from one or more sensors 416 associated with the ventilation system 400, an environmental state of an unenclosed kitchen environment, wherein the one or more sensors 416 comprise one or more of a RGB camera, a depth camera, a thermal camera, an audio sensor, or an air quality sensor, wherein the ventilation system 400 comprises one or more air-manipulating devices 413, the one or more sensors 416, an actuator 414, and an onboard computing system 418, wherein the ventilation system 400 is integrated in a kitchen hood in the kitchen environment, wherein the kitchen hood is positioned over a cooktop, and wherein the unenclosed kitchen environment comprises at least one open boundary. The method 1300 may then continue at step 1320 with the one or more processing devices (e.g., the ventilation system 400). For example, in particular embodiments, the ventilation system 400 may determine, based on the sensor data, one or more user actions within the kitchen environment. The method 1300 may then continue at step 1330 with the one or more processing devices (e.g., the ventilation system 400). For example, in particular embodiments, the ventilation system 400 may determine, based on the sensor data, a current air quality of the kitchen environment. The method 1300 may then continue at block 1340 with the one or more processing devices (e.g., the ventilation system 400). For example, in particular embodiments, the ventilation system 400 may determine, based on the current air quality, the environmental state, and the one or more user actions, one or more adjustments for one or more system-boundaries or the one or more air-manipulating devices 416 associated with the ventilation system 400, wherein the adjustments are configured to facilitate a target air quality of the kitchen environment. The method 1300 may then continue at step 1350 with the one or more processing devices (e.g., the ventilation system 400). For example, in particular embodiments, the ventilation system 400 may adjust, based on the determined adjustments, the one or more system-boundaries or air-manipulating devices 416 associated with the ventilation system 400, wherein adjusting the one or more air-manipulating devices 416 comprises one or more of modifying a position or pose of one or more of the air-manipulating devices 416, modifying one or more operation setting of one or more of the air-manipulating devices 416, or moving one or more of the air-manipulating devices 416 based on a two-degree-of-freedom movement along both a rotary axis and a linear axis. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for real-time adaptive air quality and pollution control including the particular steps of the method of FIG. 13, this disclosure contemplates any suitable method for real-time adaptive air quality and pollution control including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Systems and Methods

Figure 14:
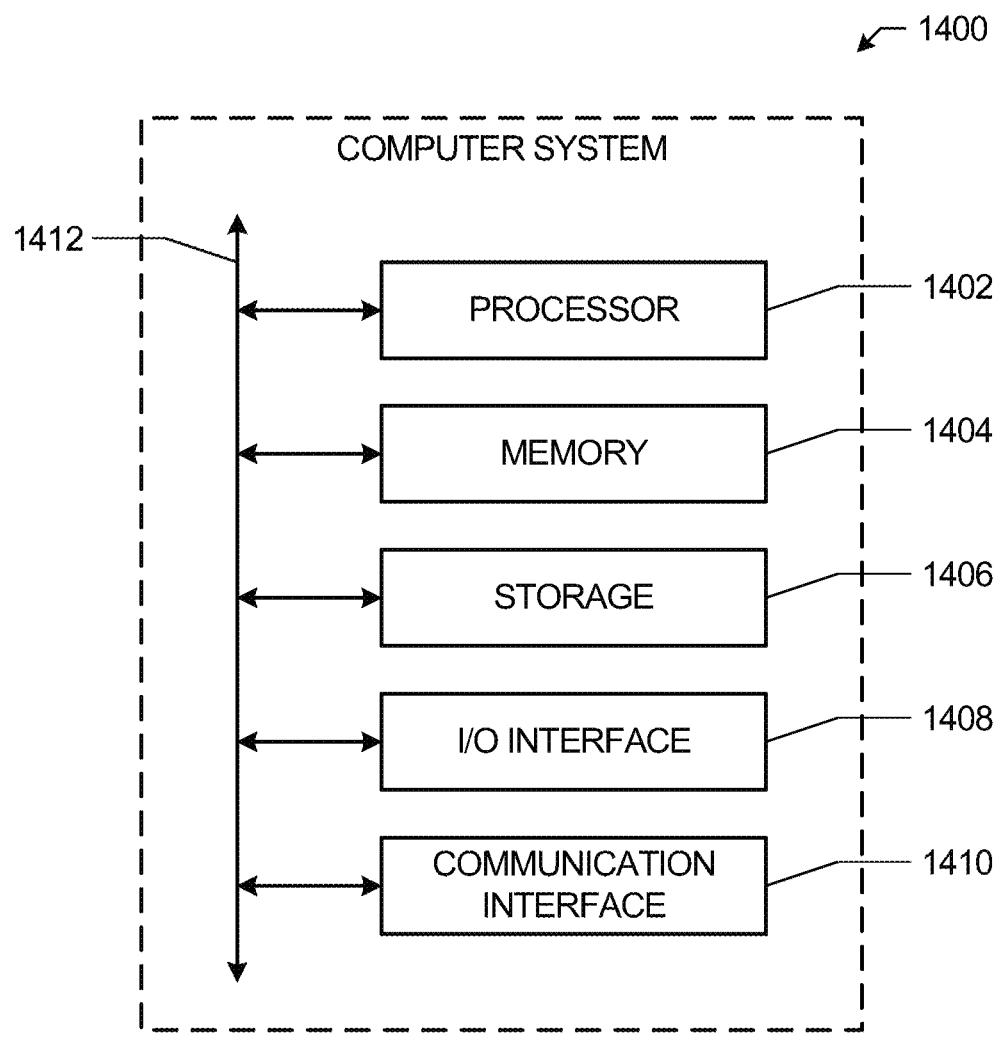
FIG. 14 illustrates an example computer system.

FIG. 14 illustrates an example computer system 1400 that may be utilized to perform real-time adaptive air quality and pollution control, in accordance with the presently disclosed embodiments. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks.

Where appropriate, one or more computer systems 1400 may perform without substantial spatial or temporal limitation one or more steps of one or more methods described or illustrated herein. As an example, and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement. In particular embodiments, processor 1402 includes hardware for executing instructions, such as those making up a computer program. As an example, and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example, and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402.

Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example, and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere).

One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memory devices 1404, where appropriate. Although this disclosure describes and illustrates particular memory, this disclosure contemplates any suitable memory.

In particular embodiments, storage 1406 includes mass storage for data or instructions. As an example, and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1406 for them. Where appropriate, I/O interface 1408 may include one or more device or software drivers enabling processor 1402 to drive one or more of these I/O devices. I/O interface 1408 may include one or more I/O interfaces 1406, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it.

As an example, and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example, and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for controlling air quality in an unenclosed kitchen environment comprising, by a ventilation system:
    determining a source location and a rate of influx for each of one or more pollutants on at least one boundary of a set of boundaries in an environment of the ventilation system, the set of boundaries comprising a fixed boundary, an adjustable boundary, and an open boundary, wherein at least one boundary in the set of boundaries comprises one or more air-manipulation devices associated with the ventilation system;
    determining, based on sensor data from one or more sensors associated with the ventilation system, a current air quality at one or more target locations of the kitchen environment;
    predicting, based on (1) the current air quality at the one or more target locations (2) one or more boundary conditions comprising the source location and the rate of influx for each of the one or more pollutants on the at least one boundary of the set of boundaries and (3) a predicted convection-diffusion of the one or more pollutants, a subsequent air quality at the one or more target locations due to an adjustment of a position of the adjustable boundary and an adjustment of an operating setting for at least one of the one or more air-manipulation devices;
    determining, based on the predicted subsequent air quality at the one or more target locations and on a target air quality of the kitchen environment, an optimal position of the adjustable boundary and an optimal operating setting for at least one of the one or more air-manipulation devices, wherein the determined position and operating setting are configured to facilitate the target air quality of the kitchen environment; and configuring, based on the determined optimal position and optimal operating setting, the adjustable boundary and the at least one of the one or more air-manipulation devices associated with the ventilation system.

2. The method of claim 1, further comprising:
determining, based on sensor data from the one or more sensors, one or more user actions within the kitchen environment,
wherein one or more of the position of the adjustable boundary or the operating setting for the at least one of the one or more air-manipulation devices are determined further based on the one or more user actions.

3. The method of claim 1, wherein the unenclosed kitchen environment comprises the open boundary.

4. The method of claim 1, wherein configuring the adjustable boundary and the at least one of the one or more air-manipulation devices comprises one or more of:
modifying a position or pose of the at least one of the one or more air-manipulating devices;
modifying one or more operation setting of the at least one of the one or more air-manipulating devices; or
moving the at least one of the one or more air-manipulating devices based on a two-degree-of-freedom movement along both a rotary axis and a linear axis.

5. The method of claim 1, wherein the ventilation system comprises:
the one or more air-manipulating devices;
the one or more sensors;
an actuator; and
an onboard computing system.

6. The method of claim 1, wherein the one or more sensors comprise one or more of an RGB camera, a depth camera, a thermal camera, an audio sensor, or an air quality sensor.

7. The method of claim 1, wherein the ventilation system is integrated in a kitchen hood in the kitchen environment, and wherein the kitchen hood is positioned over a cooktop.

8. A ventilation system comprising:
one or more displays;
one or more sensors;
one or more air-manipulating devices;
one or more non-transitory computer-readable storage media including instructions for controlling air quality in an unenclosed kitchen environment by the ventilation system; and
one or more processors coupled to the storage media, the one or more processors configured to execute the instructions to:
determine a source location and a rate of influx for each of one or more pollutants on at least one boundary of a set of boundaries in an environment of the ventilation system, the set of boundaries comprising a fixed boundary, an adjustable boundary, and an open boundary, wherein at least one boundary in the set of boundaries comprises one or more air-manipulation devices associated with the ventilation system;
determine, based on sensor data from the one or more sensors, a current air quality at one or more target locations of the kitchen environment;
predict, based on (1) the current air quality at the one or more target locations (2) one or more boundary conditions comprising the source location and the rate of influx for each of the one or more pollutants on the at least one boundary of the set of boundaries and (3) a predicted convection-diffusion of the one or more pollutants, a subsequent air quality at the one or more target locations due to an adjustment of a position of the adjustable boundary and an adjustment of an operating setting for at least one of the one or more air-manipulation devices;
determine, based on the predicted subsequent air quality at the one or more target locations and on a target air quality of the kitchen environment, an optimal position of the adjustable boundary and an optimal operating setting for at least one of the one or more air-manipulation devices, wherein the determined position and operating setting are configured to facilitate the target air quality of the kitchen environment; and
configure, based on the determined optimal position and optimal operating setting, the adjustable boundary and the at least one of the one or more air-manipulation devices associated with the ventilation system.

9. The ventilation system of claim 8, wherein the processors are further configured to execute the instructions to:
determine, based on sensor data from the one or more sensors, one or more user actions within the kitchen environment,
wherein one or more of the position of the adjustable boundary or the operating setting for the at least one of the one or more air-manipulation devices are determined further based on the one or more user actions.

10. The ventilation system of claim 8, wherein the unenclosed kitchen environment comprises the open boundary.

11. The ventilation system of claim 8, wherein configuring the adjustable boundary and the at least one of the one or more air-manipulation devices comprises one or more of:
modifying a position or pose of the at least one of the one or more air-manipulating devices;
modifying one or more operation setting of the at least one of the one or more air-manipulating devices; or
moving the at least one of the one or more air-manipulating devices based on a two-degree-of-freedom movement along both a rotary axis and a linear axis.

12. The ventilation system of claim 8, further comprising an actuator.

13. The ventilation system of claim 8, wherein the one or more sensors comprise one or more of an RGB camera, a depth camera, a thermal camera, an audio sensor, or an air quality sensor.

14. The ventilation system of claim 8, wherein the ventilation system is integrated in a kitchen hood in the kitchen environment, and wherein the kitchen hood is positioned over a cooktop.

15. A computer-readable non-transitory storage media comprising instructions for controlling air quality in an unenclosed kitchen environment by a ventilation system, the instructions being executable by a processor to:
determine a source location and a rate of influx for each of one or more pollutants on at least one boundary of a set of boundaries in an environment of the ventilation system, the set of boundaries comprising a fixed boundary, an adjustable boundary, and an open boundary, wherein at least one boundary in the set of boundaries comprises one or more air-manipulation devices associated with the ventilation system;
determine, based on sensor data from one or more sensors associated with the ventilation system, a current air quality at one or more target locations of the kitchen environment;

predict, based on (1) the current air quality at the one or more target locations (2) one or more boundary conditions comprising the source location and the rate of influx for each of the one or more pollutants on the at least one boundary of the set of boundaries and (3) a predicted convection-diffusion of the one or more pollutants, a subsequent air quality at the one or more target locations due to an adjustment of a position of the adjustable boundary and an adjustment of an operating setting for at least one of the one or more air-manipulation devices;

determine, based on the predicted subsequent air quality at the one or more target locations and on a target air quality of the kitchen environment, an optimal position of the adjustable boundary and an optimal operating setting for at least one of the one or more air-manipulation devices, wherein the determined position and operating setting are configured to facilitate the target air quality of the kitchen environment; and configure, based on the determined optimal position and optimal operating setting, the adjustable boundary and the at least one of the one or more air-manipulation devices associated with the ventilation system.

16. The media of claim 15, wherein the instructions are further executable by the processor to:

determine, based on sensor data from the one or more sensors, one or more user actions within the kitchen environment, wherein one or more of the position of the adjustable boundary or the operating setting for the at least one of the one or more air-manipulation devices are determined further based on the one or more user actions.

17. The media of claim 15, wherein the unenclosed kitchen environment comprises the open boundary.

18. The media of claim 15, wherein configuring the adjustable boundary and the at least one of the one or more air-manipulation devices comprises one or more of:

modifying a position or pose of the at least one of the one or more air-manipulating devices;

modifying one or more operation setting of the at least one of the one or more air-manipulating devices; or moving the at least one of the one or more air-manipulating devices based on a two-degree-of-freedom movement along both a rotary axis and a linear axis.

19. The media of claim 15, wherein the ventilation system comprises:

the one or more air-manipulating devices;

the one or more sensors;

an actuator; and an onboard computing system.

20. The media of claim 15, wherein the one or more sensors comprise one or more of an RGB camera, a depth camera, a thermal camera, an audio sensor, or an air quality sensor.

* * * * *